(12) United States Patent
Manova-Elssibony et al.

(10) Patent No.: US 9,762,081 B2
(45) Date of Patent: Sep. 12, 2017

(54) WIRELESS CHARGING DEVICE

(71) Applicant: Humavox Ltd., Kfar Saba (IL)

(72) Inventors: Asaf Manova-Elssibony, Petah Tiqva (IL); Oded Golan, Tel Aviv (IL)

(73) Assignee: Humavox, Ltd., Kfar Saba (IL)

( * ) Notice: Subject to any disclaimer, the term of this patent is extended or adjusted under 35 U.S.C. 154(b) by 117 days.

(21) Appl. No.: 14/403,418

(22) PCT Filed: May 29, 2013

(86) PCT No.: PCT/IL2013/050456
§ 371 (c)(1),
(2) Date: Nov. 24, 2014

(87) PCT Pub. No.: WO2013/179284
PCT Pub. Date: Dec. 5, 2013

(65) Prior Publication Data
US 2015/0171658 A1    Jun. 18, 2015

Related U.S. Application Data

(60) Provisional application No. 61/736,570, filed on Dec. 13, 2012, provisional application No. 61/736,582,
(Continued)

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/23* (2016.02); *H02J 50/70* (2016.02); *H02J 50/80* (2016.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 6,127,799 A * 10/2000 Krishnan ........... G06K 19/0701
320/104
2004/0145342 A1 * 7/2004 Lyon ....................... H02J 7/025
320/108
(Continued)

FOREIGN PATENT DOCUMENTS

WO    WO-2012/026895 A2    3/2012

OTHER PUBLICATIONS

International Search Report Issued in PCT/IL2013/050456 on Nov. 29, 2013.

*Primary Examiner* — Arun Williams
(74) *Attorney, Agent, or Firm* — Maxwell L. Minch; GrayRobinson, P.A.

(57) ABSTRACT

The present invention provides wireless charging techniques and devices for charging electronic device(s) within a closed space defined by a substantially hollow housing containing an antenna arrangement and configured to define an inner cavity for propagation of electromagnetic radiation from the antenna arrangement. The housing has an inner surface, encompassing the inner cavity, which geometry and material composition selected to define a general propagation path for the predetermined electromagnetic radiation from the antenna arrangement towards a charging zone. The inner cavity of the housing operates as a waveguide for directionally guiding the electromagnetic radiation to the charging zone and providing substantially maximal intensity of the electromagnetic radiation within the charging zone.

18 Claims, 13 Drawing Sheets

Related U.S. Application Data filed on Dec. 13, 2012, provisional application No. 61/652,337, filed on May 29, 2012.

(51) Int. Cl.

| | |
|---|---|
| *H04B 5/00* | (2006.01) |
| *H04B 7/06* | (2006.01) |
| *H04B 7/12* | (2006.01) |
| *H02J 50/23* | (2016.01) |
| *H02J 50/70* | (2016.01) |
| *H02J 50/90* | (2016.01) |
| *H02J 50/80* | (2016.01) |
| *H02J 50/40* | (2016.01) |
| *H02J 50/50* | (2016.01) |

(52) U.S. Cl.
CPC ............ *H02J 50/90* (2016.02); *H04B 5/0006* (2013.01); *H04B 5/0037* (2013.01); *H04B 7/0602* (2013.01); *H04B 7/0682* (2013.01); *H04B 7/12* (2013.01); *H02J 7/0044* (2013.01); *H02J 50/40* (2016.02); *H02J 50/50* (2016.02)

(58) Field of Classification Search
USPC .......................................................... 320/108
See application file for complete search history.

(56) References Cited

U.S. PATENT DOCUMENTS

| | | | |
|---|---|---|---|
| 2006/0238365 A1* | 10/2006 | Vecchione | G04C 10/00 340/657 |
| 2006/0284593 A1 | 12/2006 | Nagy et al. | |
| 2008/0130124 A1 | 6/2008 | Graham | |
| 2009/0268411 A1* | 10/2009 | Baker | B60R 11/02 361/724 |
| 2009/0303693 A1 | 12/2009 | Mao | |
| 2010/0315045 A1 | 12/2010 | Zeine | |
| 2011/0046438 A1 | 2/2011 | Iwaisako | |
| 2011/0080050 A1 | 4/2011 | Thundat et al. | |
| 2011/0248575 A1 | 10/2011 | Kim et al. | |
| 2012/0049650 A1 | 3/2012 | Bella | |

* cited by examiner

WIRELESS CHARGING DEVICE

CROSS-REFERENCE TO RELATED APPLICATION

This patent application is a U.S. National Phase application under 37 U.S.C. §371 of Patent Cooperation Treaty Application No. PCT/IL2013/050456, filed on May 29, 2013, entitled "Wireless Charging Device," the contents of which are incorporated herein by reference in entirety.

TECHNOLOGICAL FIELD

The present invention relates to wireless charging techniques and devices for charging various types (typically handheld) of devices.

BACKGROUND

There are many devices that use electricity as their energy source, but due to their mobility needs use batteries as their energy supply. Such energy consumers vary and may include without limitation medical devices/appliances (e.g. hearing aid devices), computer peripheral devices (e.g., mouse, keyboard, and the like), remote controllers (e.g., for televisions, set-top boxes, air conditioning devices, and suchlike), shaving devices, and the like. Such consumer devices typically need replacement/recharging of their batteries from time to time.

Regular batteries are not reusable, their improper disposal is a source of pollution, and their replacement may be tiresome. Therefore many of the consumer devices nowadays employ rechargeable batteries, where recharging is implemented by connecting a battery to a specific charging device, which typically has a design dedicated for connecting and charging a specific battery/device or a specific type of battery/device. Although this approach reduces the use of regular non-reusable batteries, it led to a situation where each rechargeable consumer device requires a specific dedicated charger for charging its batteries.

One possible approach to preclude the need for a plurality of dedicated chargers for the various rechargeable consumer devices is based on wireless charging techniques. For example, RF radiation energy available in surroundings of an electric device to be charged (e.g., RF from cellular networks and phones, as well as from other sources), may generally be utilized for recharging a small battery of an electric device. Such RF wireless charging techniques are known as RF energy harvesting. Typically, with ambient RF energy harvesting, there is no enough energy available to effectively recharge the batteries for their continuous uninterrupted use.

Another known approach is described for example in the following publications: U.S. Pat. No. 6,967,462 describes charging of devices by microwave power beaming. This technique is aimed at providing wireless, charging power and/or primary power to electronic/electrical devices whereby microwave energy is employed. Microwave energy is focused by a power transmitter comprising one or more adaptively-phased microwave array emitters onto a device to be charged. Rectennas within the device to be charged receive and rectify the microwave energy and use it for battery charging and/or for primary power. A locator signal generated by the device to be charged is analyzed by the system to determine the location of the device to be charged relative to the microwave array emitters, permitting the microwave energy to be directly specifically towards the device to be charged. Backscatter detectors respond to backscatter energy reflected off of any obstacle between the device to be charged and the microwave array emitters. Power to any obstructed microwave array emitter is reduced until the obstruction is removed. Optionally, data can be modulated onto microwave energy beams produced by the array emitters and demodulated by the device, thereby providing means of data communication from the power transmitter to the device. Similarly, data can be modulated onto the locator signal and demodulated in the power transmitter, thereby providing means of data communication from the device to the power transmitter.

U.S. Pat. No. 6,127,799 describes a method and apparatus for wireless powering and recharging. According to this technique, an arrangement is provided for charging a charge storage device by placing the charge storage device in an RF or microwave radiation field. One or more antennas which receive the radiated RF electromagnetic field are placed on the charge storage device. Rectifiers connected to the antennas rectify the received RF electromagnetic field and produce a DC output current which is used to charge the charge storage device. The charge storage device may be a battery or a capacitor and may form an integral part of an electronic device. The same RF field that charges the charge storage device can also be employed to communicate data to transponders which may be associated with computing devices.

GENERAL DESCRIPTION

There is a need in the art for wireless charging techniques enabling efficient and fast charging of different chargeable devices of the type capable of harvesting energy from surroundings.

The present invention provides a novel charging device configured for charging electric devices having various designs and utilizing various types of batteries, as well as for simultaneously charging of multiple devices, by efficiently transferring electromagnetic radiation into a charging zone (e.g., substantially planar or curved). The term "charging zone" used herein refers to a volume/space inside a closed housing in which a charging process is to occur and in which a device to be charged is to be located. The transfer of the electromagnetic radiation from a radiation emitter arrangement located in the housing is configured to create a maximal radiation volume, at times referred hereinbelow as maximal energy volume (MEV), at a certain location inside the housing, i.e., a volume in which the electromagnetic radiation is of substantially maximal intensity. The charging device of the invention is configured and operable so as to provide at least partial overlap between the MEV and the charging zone, that may be defined by a location/site inside the cavity, e.g. a support surface, for locating device(s) to be charged, to thereby achieve efficient and fast charging of one or more devices while located in the charging zone.

The inventors of the present invention have found that efficiency and safety of a wireless charging process may be substantially improved by carrying out the charging process inside a closed structure/housing (e.g., electrostatically shielded enclosure such as a Faraday cage) which has inner surfaces defining a cavity configured to direct and concentrate the charging electromagnetic radiation, generated inside the closed housing, to a charging zone in said cavity where device(s) being charged is/are placed. In particular, the inventors have found that the intensity of the electromagnetic radiation can be maximized, and also uniformly distributed, within the defined charging zone by proper selection of materials and geometry (dimensions and possibly also shape) of the inner surfaces of the substantially hollow housing defining said cavity, and one or more parameters (at least frequency) of the electromagnetic radiation generated thereinside and used for charging. For example, the parameters of the inner surface of the housing defining the parameters of the cavity (width, height, etc.) are selected in accordance with the frequency band intended to be used, and further the frequency of the radiation might be tuned to further adjust the volume of the substantially maximal intensity of radiation to at least partially overlap with the charging zone. The present application aims to provide a device and method for creating a maximal energy volume (density) in a desired location inside a charging device (charging zone) created by the transmitted electromagnetic waves so as to provide charging of various devices with different shapes and sizes in the same universal charging device with maximal efficiency of the charging process.

The above is achieved by proper selection of geometry (dimensions and possibly also shape) and material composition of the inner surfaces of the housing to thereby define a general propagation path for predetermined electromagnetic radiation generated inside the housing through the cavity towards the charging zone. According to the invention, the housing operates as a waveguide for directionally guiding the predetermined electromagnetic radiation to the charging zone. The system of the invention is further configured to adjust the position of the maximal energy volume (MEV) inside the housing in the vicinity of the charging zone, to maximize the delivery of electromagnetic energy to the devices being charged, by changing the altitude of the MEV, and/or shifting/rotating it in a transversal plane of the housing, by proper selection (e.g., controlling and adjusting) one or more parameters of the generated radiation.

The charging device provided herein allows for efficient charging of electric device(s) in any orientation of the electric device being charged, as long as said electric device is located within the MEV. The charging of the electric device located inside the MEV, is optimal, while charging process is independent of the orientation of the electric device within the charging device (i.e., inside a cavity defined by the housing of the charging device).

In some embodiments, the location of the MEV inside the housing is passively (e.g., using reflectors, diffusers and/or absorbers) and/or actively (e.g., by adjusting various parameters of the emitted radiation) adjusted so as to partially or fully overlap, the charging zone defined inside the housing where the devices to be charged are to be placed. It should be noted that when the MEV is focused/energy concentrated, it might be smaller in size than the charging zone, and will thus only partially overlap/cover the charging zone. Accordingly, the active adjustment (displacement) of the position of the MEV may be used. Thus, the techniques and arrangements described herein guarantee that the energy transfer is maximized within the charging zone.

The present application is also directed to a novel sensor unit usable for providing indications associated with the charging process that is being carried out. For example, in some embodiments, the sensor unit is used for indicating the efficiency of the charging process. The inventors of the present invention also found out that the sensor unit may be also used to communicate between the device that is being charged and a control unit of the charging device.

In one aspect of the invention, there is provided a charging device for wirelessly charging at least one chargeable device (e.g., electric device) inside a housing containing an antenna arrangement. The housing is configured to define a cavity for electromagnetic radiation propagation from the antenna arrangement towards a charging zone inside the housing. The housing may comprise a supporting surface for supporting the at least one electric device inside the cavity (e.g., at the charging zone) during the charging process.

Further provided is a removable seal (i.e., closing lid) configured to allow placement of the chargeable device inside the housing e.g., on the support surface. In some embodiments the seal is provided as an integral part of the housing configured to permit access to the inner cavity of the housing through an opening provided in the housing for placement of a chargeable device thereinside, and to seal the opening to prevent/minimize leakage of electromagnetic radiation from the housing to the environment external to the housing and to further allow the charging functionality of the charging device.

The housing comprises an inner surface configured to define the cavity. Geometry (dimensions and shape) and material composition (e.g., electrically conducting materials, such as but not limited to, copper and aluminum) of the inner surface of the housing are selected in accordance with the predetermined electromagnetic radiation (frequency band of said radiation) emitted from the antenna arrangement, such that the inner cavity operates as a waveguide for directionally guiding the predetermined electromagnetic radiation to the charging zone and enabling to create a volume of substantially maximal intensity of the electromagnetic radiation within at least a part of the charging zone, while substantially preventing the radiation from escaping the housing to the environment external to the housing. The geometry and configuration of the inner surface of the housing may also provide substantially uniform distribution of the electromagnetic radiation within the charging zone.

The housing is preferably electromagnetically and/or electrostatically shielded. For example, the housing may be implemented in form of a Faraday cage.

In some embodiments the inner surface of the housing is substantially reflective with respect to the predetermined electromagnetic radiation. The inner surface of the housing may be configured to define a substantially cylindrical or rectangular geometry of the inner cavity (e.g., by defining a structure having a substantially circular or polygonal cross-section). Alternatively, the inner surface of the housing may be configured to define a substantially tapering cavity structure (e.g., defining a conical or multiple-sided pyramid-like geometry).

In some embodiments, the inner surface of the housing while defining substantially circular, conical or polygonal cavity further comprises at least one radiation directing element inwardly projecting therefrom (towards the radiation propagation path). The at least one radiation directing element may be configured to directionally reflect (or deflect) the electromagnetic radiation towards the charging zone and/or to scatter the electromagnetic radiation to cause further multiple reflection of the radiation from the inner surface towards the charging zone.

In some embodiments the inner surface of the housing has a surface relief for defining the geometry of a volumetric charging zone.

The seal of the housing may be configured as a reflector, diffuser or absorber with respect to the predetermined radiation emitted inside the housing.

The antenna arrangement comprises at least one radiating antenna or an array of such antennas, configured to emit electromagnetic radiation towards the charging zone. For example, the antenna arrangement may comprise an array of radiating antennas arranged in a spaced apart relationship along a substantially linear or closed loop path. In some applications, the antenna arrangement comprises at least two dipole antennas.

The housing (its inner surface) and the antenna arrangement may be configured and operable to create a predetermined interference pattern of the propagating radiation to thereby provide the substantially maximal intensity within the charging zone. Additionally or alternatively, the antenna arrangement comprises phase shifted antennas configured to provide the substantially maximal intensity within the charging zone. In some embodiments, the antenna arrangement is operable to create a predetermined phase pattern of the radiation emitted by the antennas to provide the substantially maximal intensity within the charging zone.

In some embodiments, the antennas are associated with (connectable to) a switching unit configured to operate the antennas according to a predetermined time pattern to thereby provide a predetermined phase pattern of the radiation emitted by the antennas, aimed at providing the substantially maximal intensity within the charging zone. For example, the phase pattern may be set such that phases of the radiation emitted by the antennas vary along at least one axis in a plane substantially perpendicular to the general radiation propagation path. In addition, the antenna arrangement may be associated with a frequency controller enabling controllable variation of a frequency of the electromagnetic radiation within the charging zone.

In some embodiments, the housing contains a sensor unit configured and operable for measuring radiation intensity in the vicinity of the sensor unit, thereby enabling controlling intensity distribution of the radiation within the charging zone. The sensor unit may comprise at least one sensing antenna located at a known distance from the charging zone, to thereby enable controlling the intensity distribution of the radiation within the charging zone. The sensor may be also configured and operable to detect a change in one or more parameters of the radiation in the vicinity thereof to thereby identify a signal from the chargeable device and generate data indicative thereof.

In some embodiments, the sensor unit is configured for communication with a control utility to thereby enable operation of the antenna arrangement to carry out at least one of the following: (a) selective deactivation of at least one antenna of the antenna arrangement, (b) controllable variation of a frequency of the radiation, (c) controllable variation of a phase shift between waves radiated from antennas of the antenna arrangement.

The charging device may comprise a controller located outside the housing, being connectable to one or more elements inside the housing, and configured and operable to carry out at least one of the following: (1) provide a phase shift between the antennas; (2) controllably vary a frequency of said radiation to provide an optimal frequency of the radiation in the charging zone; (3) selectively deactivate at least one antenna of the antenna arrangement.

In another aspect of the invention, there is provided a method for use in wireless charging of at least one chargeable device using a charging device configured according to any one of embodiments described hereinabove and hereinbelow. The method may comprise operating the antenna arrangement to generate the electromagnetic radiation having frequency and phase selected in accordance with at least the location of the charging zone to thereby create the volume of the maximal intensity of said radiation within at least a part of the charging zone, and monitoring the radiation in the vicinity of the charging zone, to thereby carry out at least one of the following: (1) provide a phase shift between antennas of the antenna arrangement; (2) controllably vary a frequency of the radiation to provide an optimal frequency of the radiation in the charging zone; (3) selectively deactivate at least one antenna of the antenna arrangement.

In yet another aspect of the invention, there is provided a method of configuring a charging device for closed-space RF charging of one or more electric devices. The method may comprise selecting geometry and material composition of inner surfaces of a closed hollow housing and selecting a location and configuration of an antenna arrangement to be located inside a cavity, said cavity being defined by said selected geometry and material composition of the inner surfaces in accordance with certain electromagnetic radiation emitted by the antenna arrangement, such as to provide a general propagation path for predetermined electromagnetic radiation from the antenna arrangement towards a charging zone inside the cavity. The geometry and material composition of the inner surfaces are selected in accordance with the radiation emitted by the antenna arrangement to provide substantially maximal intensity of a predetermined electromagnetic radiation within at least a part of the charging zone, thereby permitting efficient charging of the electric device independent of its orientation relative to the housing.

In another aspect there in provided a charging device for wireless charging at least one electric device, the charging device comprising a housing containing an antenna arrangement, wherein said housing is substantially hollow defining an inner cavity for propagation of predetermined electromagnetic radiation from the antenna arrangement, the housing comprises an inner surface thereof configured to define the inner cavity, geometry and material composition of the inner surface being selected to define a general propagation path for the predetermined electromagnetic radiation from the antenna arrangement towards a charging zone inside the cavity, such that the inner cavity operates as a waveguide directionally guiding the predetermined electromagnetic radiation to the charging zone and creating a volume of substantially maximal and uniformly distributing intensity of the electromagnetic radiation within at least a part of the charging zone, to thereby enable efficient charging of the electric device located in the charging zone, the efficient charging being independent of the electric device orientation relative to the housing.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings. Dimensions of components and features shown in the figures are generally chosen for convenience and clarity of presentation and are not necessarily shown to scale. The figures presented are in the form of schematic illustrations and, as such, certain elements may be drawn greatly simplified or not-to-scale, for illustrative clarity. The figures are not intended to be production drawings.

In the figures (Figs.) listed below, the same numeral references are used to designate identical or similar elements, and in which:

FIG. 1B shows the same with a chargeable device located in place for charging;

FIG. 6B is a plot showing the simulation results obtained for this setup;

FIG. 7B is a plot showing the simulation results obtained for this setup; FIG. 8B is a plot showing the simulation results obtained for this setup.

DETAILED DESCRIPTION OF EMBODIMENTS

Figure 1A:
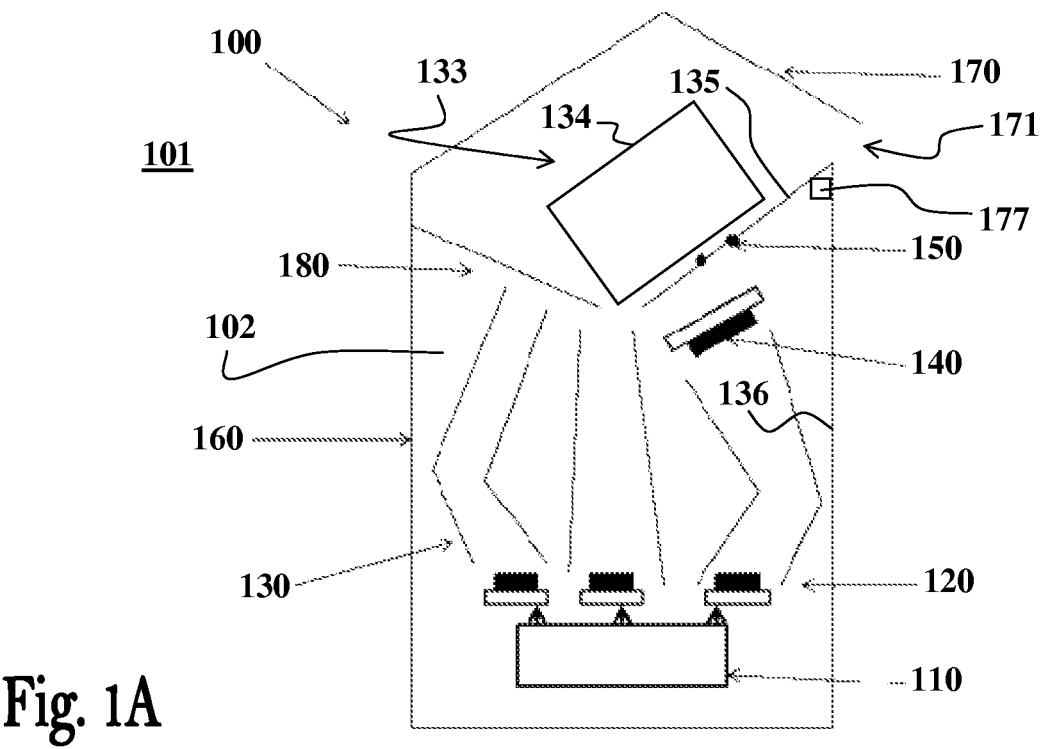
FIGS. 1A and 1B schematically illustrate a charging device based on RF energy harvesting according to some possible embodiments, wherein FIG. 1A exemplifies possible structure and internal arrangement of the charging device.

As indicated above, there is a need for suitable solutions for accelerating charging sessions of a battery of an electric device based on RF energy harvesting techniques, preferably during off usage time periods (i.e., when the device is not in use). Since such off usage time periods are typically limited, there is a need to radiate the harvesting unit of the chargeable device with intense radiation during the charging session. The level of such radiation often exceeds the regulatory limitation of radiation. Therefore there is a need for a confined charging device design configured to minimize/prevent leakage of radiation to the external environment.

The present disclosure provides a novel charging device configured to allow wireless charging of a chargeable device (e.g., operating with rechargeable batteries) based on RF energy harvesting techniques. The charging device comprises a closed housing and an antenna arrangement positioned thereinside. The housing is configured to define an inner cavity for radiation propagation and a charging zone inside the housing in which the intensity of RF radiation emitted from the antenna arrangement is maximal and substantially uniform. The invention is thus particularly for use as a wireless universal charging device for RF harvesting based chargeable devices. Generally speaking, the inside of the substantially hollow housing defines a cavity for radiation propagation between the antenna arrangement and the charging zone such that the housing operates as a waveguide for directionally guiding the emitted radiation towards the charging zone and providing the maximal radiation at the charging zone.

The housing may be designed as an electrostatic shielded housing (e.g., metal envelope) configured to guarantee minimal leakage of RF radiation from the housing to the environment external to the housing (e.g., by implementing a Faraday cage), and for concentrating the radiated RF energy in a predefined area (the charging zone), using resonance and reflection phenomena. Further, the housing defines a support surface (planar or curved) for supporting device(s) being charged. This support surface is located within or in the closest vicinity to the charging zone. The RF radiation source (antenna arrangement) is configured and operable to emit RF radiation in preconfigured frequencies and intensities suitable for RF harvesting by device(s) being charged;

The following are some specific but not limiting examples of the charging device of the invention. It should be noted that although in these examples a housing of the charging device is shown as having a generally cylindrically shaped inner cavity, that the invention is not limited to this specific example, and according to the principles of the invention the housing, being implemented as a closed-chamber RF radiation waveguide, may have different shapes and dimensions of the inner cavity thereof (e.g., having a conical shape, polygonal cross section shape, and/or 3, 4, 5, 6, or more, sided pyramid shape, such as trigonal, tetragonal, hexagonal, and suchlike), which are all within the scope of the present invention.

It should also be understood, although not specifically shown that the device of the present invention is configured for effective charging of different devices with different shapes and sizes and battery types within the same housing.

The examples described below with reference to the figures refer to charging devices utilizing a closed electrostatically shielded housing configuration for carrying out wireless RF charging processes. It should be however clear that the present invention is not limited to such configurations and that it is applicable to other forms of closed space structures (e.g., hollow waveguide structures such as antenna waveguides). Accordingly, the terms housing, chamber, and "closed space" may be interchangeably used in the following description.

Figure 1B:
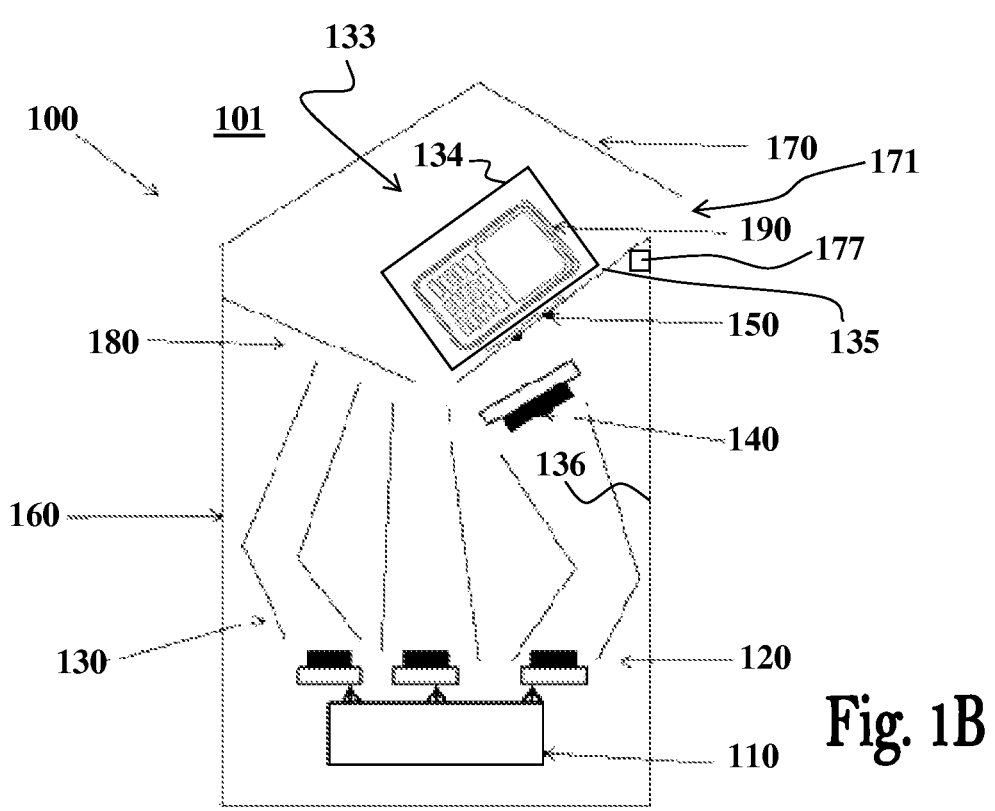

FIGS. 1A and 1B schematically illustrate a charging device 101 comprising a housing 100 configured to provide an accelerated RF wireless harvesting charging process, of a chargeable device (190 in FIG. 1B), in accordance with some possible embodiments. The device 101 comprises an antenna arrangement 120 (associated with RF source/transmitter 110), located inside the housing 100 and configured and operable to emit RF radiation inside the housing 100. The transmitter 110 is configured and operable to convert electric energy, received from an electrical power source (not shown), to RF radiation that is emitted inside the housing 100 through the antenna arrangement 120.

The antenna arrangement may generally be formed by a single antenna unit. In this specific but not limiting example, the antenna arrangement 120 includes an array of antennas (three such antenna being seen in the figure) and possibly also an additional antenna unit 140 as will be described further below.

The housing 100 is configured to define an inner cavity 102 for propagation of the emitted radiation towards a charging zone 133 inside the housing, where a supporting surface 134 is provided for placing therein one or more devices to be charged. The supporting surface may be planar, or may be curved defining a volumetric holder of the device(s) being charged. The geometry (e.g. dimensions) of the cavity 102 is defined by that of inner surface 136 of the housing. In this specific not limiting example, the inner surface of the housing defines a generally cylindrical/tubular shape of the radiation cavity 102. Further provided is a seal 170 (e.g., metal cover), which may be either entirely removable or include a displaceable part thereof, to provide access to the inside of the housing 100. The seal 170, as well as the other parts of the housing, is made of metallic material(s) or from any other suitable material(s), substantially preventing RF transmission therethrough, e.g., to form an electrostatic shield (e.g., Faraday cage) for minimizing the RF energy that is radiated to the environment external to the housing 100, for safety requirements.

In this example, the antenna arrangement 120 is located at a bottom part of the housing 100, and the charging zone 133 is defined at an upper part of the housing. The majority of the RF radiation that is emitted from the antenna arrangement 120 propagates upwardly along a general radiation propagation path through the inner cavity 102 of the housing 100 towards the charging zone 133 due to the waveguide configuration (shape/dimensions/material of the inner surface 136 of the housing 100.

For example, the inner shape/dimensions of the housing 100 may be configured to form a cylindrical, or polygonal, cross-sectional shape. Optionally, the geometry of the inner surface of the housing 100 (e.g. the geometry of the cavity 102) may be selected to provide a tapering configuration, wherein the cross-sectional area of the inner space 102 of the housing 100 gradually decreases towards the upper portion of the housing, wherein the charging zone 133 is located.

Waveguide configuration of the cavity 102 provided by the reflective property of the inner surface 136 and geometry (dimensions/shape) of the inner surface 136 of the housing 100 selected in accordance with the frequency of the RF radiation emitted by the antenna, provides that maximal amount of energy from the emitting antenna arrangement 120 reaches the charging zone and thus a device 190 being charged. The location of the maximal energy volume (MEV), is defined by the emitted radiation (frequency and phase) and the configuration of the waveguide inner cavity 102 and it is designed to cover, either fully (overlap) or partially, the charging zone 133.

In some embodiments, the position of the device 190 located on the supporting surface 134 inside the housing 100 may be properly adjusted by a registration/positioning mechanism, for example including a guiding element 135 (e.g., comprising at least one slide guiding element) which directs/slides the device 190 to a desired location on the surface 134, so as to guarantee optimal positioning of the device to be charged in relation to the MEV 133.

As indicated above, in some embodiments, the antenna arrangement, in addition to emitting antenna arrangement 120, also includes a receiving antenna unit (one or more antenna units 140 (e.g., built-in the housing 100 of the device) that may be used to amplify the efficiency of the harvesting which usually employs only an internal receiving antenna (harvesting antenna) of the device being charged. The receiving antenna arrangement 140 may become particularly useful in situations, wherein the device being charged comprises a small sized harvesting antenna (e.g., due to design restrictions, such as in case of some medical devices, e.g. hearing aid devices). For this purpose a contact element 150 may be provided in the charging zone 133 (on the support surface 134) for coupling the receiving antenna arrangement 140 with the internal harvesting receiving antenna of the device 190 being charged. The contact element 150 may be designed to establish fast connection with a respective connection provided in the device to be charged. For example, contact element 150 may be shaped in a form of a disk or a line or any other suitable form.

In some embodiments, the insertion of a specific chargeable device into the housing 100 activates an identification sensor (not shown) configured and operable to identify the inserted chargeable device and generate data indicative thereof. The data generated by the identification sensor may be received and used by a control unit (540 in FIG. 4A) of the charging device 101 to determine parameters needed for the charging session (e.g., possible charging rates, charging powers, time durations of charging sessions, and suchlike).

In some embodiments the transmitter 110 supplies the RF power to antenna arrangement 120 according to preset parameters provided to the transmitter 110 from the control unit (540) of the charging device. For example, the parameters defined by the control unit for operating the transmitter 110 may be determined according to the information received from the identity sensor. Transmission parameters, such as frequency and intensity, which may be different for different chargeable devices, may be selectively adjusted according to identification data of the device to be charged obtained by the identification sensor. Optionally, in some embodiments, the frequency and intensity of the RF power generated by the transmitter 110 to the antenna arrangement 120 may be fixed and predetermined.

In some embodiments, the device being charged is configured to communicate data with the charging device 101 and provide it with information about its charging characteristics (e.g., energy level), and thereby enable the device to be charged to dictate the time duration (and other parameters) of the charging session, as may be required to adequately charge the device. Alternatively, in possible embodiments the time duration of the charging session may be fixed and preset regardless of the type and characteristics of the device that is being charged.

In some possible embodiments, the transmitter 110 may simultaneously feed the antenna arrangement 120 with several frequencies to increase harvesting efficiency and to decrease the time duration of the charging session.

In an exemplary embodiment, the device being charged may be configured to generate indications (via its internal antenna and/or via the contact element 150) to inform the charging device 101 that the charging session is completed. The charging device may comprise a corresponding indicator (not shown) external to the housing 100, configured and operable to generate audible/visual indications responsive to the indications generated by the device that is being charged.

The housing 100 may be enclosed by a metallic seal 160 having an opening 171 and a movable seal 170, configured to provide access to the inside of the housing 100 via the opening 171. The movable seal 170 may be fabricated from a metallic material or from any other suitable material having a metallic seal such as metallic seal 160 of the housing 100.

The metallic seal 160 and the movable seal 170 are configured to serves as an electrostatic shield (e.g., Faraday cage) for minimizing the RF energy that is radiated to the environment external to the housing 100, for safety requirements. A safety sensor 177 may be provided inside, or on the external surface of, the housing 100 for indicating proper closure of the opening 171 by the movable seal 170. The safety sensor 177 may be configured and operable to determine/measure closure of the opening 171, and generate data indicative thereof. The data generated by the safety sensor may be used to prevent activation of the transmitter 110 while the opening 171 is not hermetically closed and thereby avoid undesired situations of transmitting RF radiation to the environment external to the housing 100. For example, the data generated by the safety sensor 177 may be used by the control unit (540) for determining proper closure of the opening 171 and enabling the RF transmission only when the opening 171 is properly closed. In possible implementations a visual and/or vocal alarm may be generated to indicate that the housing 100 is open, or not properly closed.

In some possible embodiments, a radiation directing/guiding element 180 may be situated in the vicinity of the charging zone 133 to direct the RF radiation to the charging zone 133 and thereby maximize the RF energy received by the internal receiving antenna of the device that is being charged. For example, the radiation directing element 180 may be a type of dielectric material configured to concentrate the RF energy to the desired charging zone 133.

The housing 100 may be manufactured form an electrically conducting material including, for example and without limitation, copper or any other suitable metal. The height of the housing 100 and its diameter may be determined according to the frequency of the RF radiation emitted inside the housing. The seal 160 provided over the housing 100 may be made from the same materials as the inner surface of the housing. The antenna array 120 may comprise one or more directional and/or omnidirectional antennas, or an array of such antennas, configured and operable to transmit the RF signals produced by the transmitter 110 towards the charging zone 133.

FIG. 1B schematically illustrates the charging device 101 shown in FIG. 1A with a chargeable device 190 inserted into the housing 100, in accordance with possible embodiments.

Figure 2A:
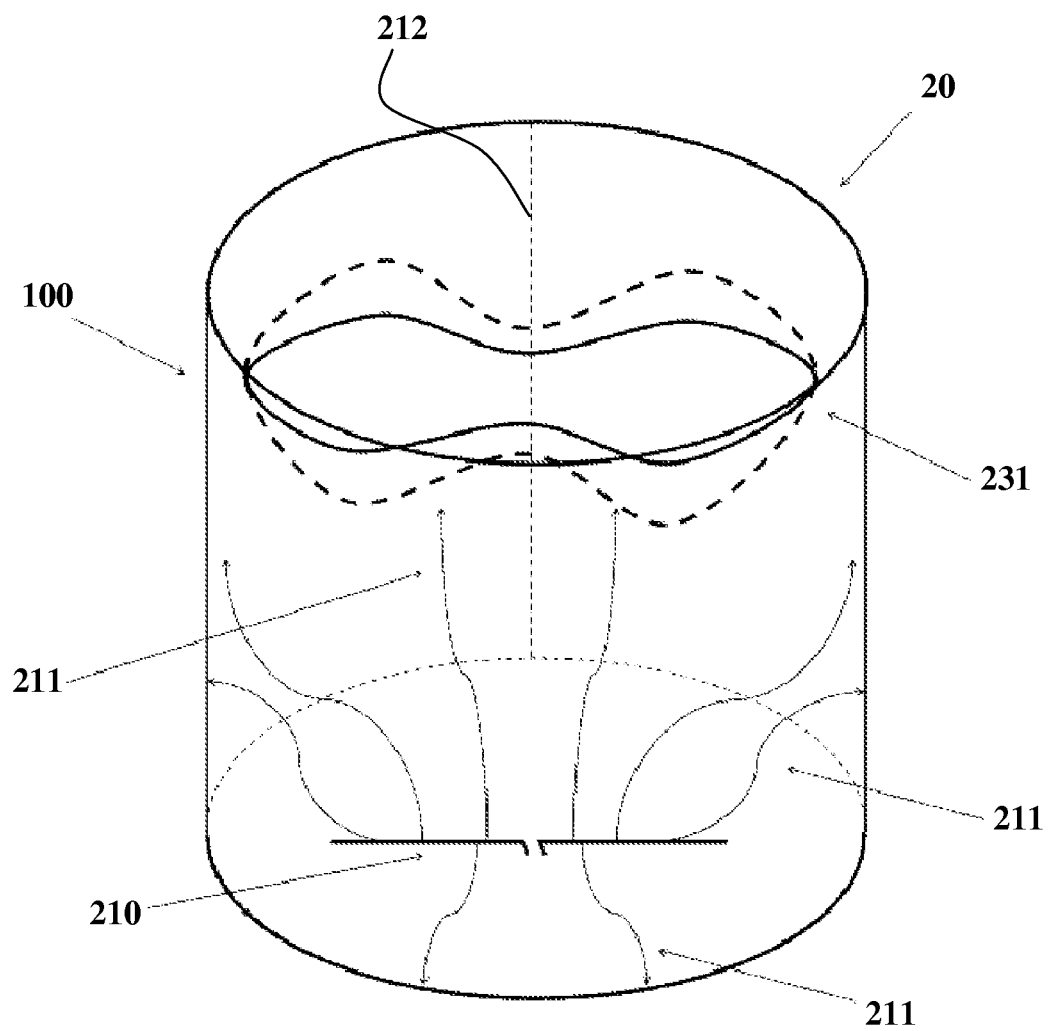
FIGS. 2A to 2D schematically illustrate a charging device according to some other possible embodiments, wherein FIG. 2A demonstrates standard distribution of the RF radiation transmitted from an antenna arrangement positioned inside the housing of the charging device, FIGS. 2B-2C demonstrate an example of a mechanical element that can be used inside the housing to assist in the directional transmission of the emitted radiation to centralize a maximal energy volume (density) of the transmitted RF radiation in a predetermined shape and location inside the charging device, and FIG. 2D demonstrates the housing with the element of FIGS. 2B-2C used in the charging device for obtaining a defined maximal energy volume (density) positioned in a predetermined location inside the charging device.

FIG. 2A demonstrates standard distribution of RF radiation waves 211 transmitted from an antenna arrangement 210 positioned inside the housing 100 of a charging device 20, according to some possible embodiments. FIG. 2A further demonstrates creation of a MEV 231 inside the housing 100. The geometry, exact positioning, and energy density of the MEV 231 in such configuration are fixedly (not being adjustable) determined by the geometry and material composition of the inner surface of the housing, and thus, although charging might occur, the charging process will be hard to control and most probably will not be optimal. Consequently, a charging zone might not be well defined.

Figure 2B:
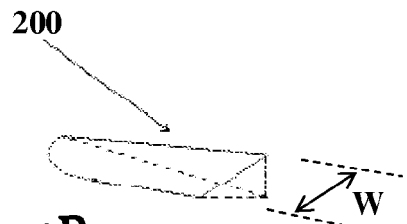
Figure 2C:
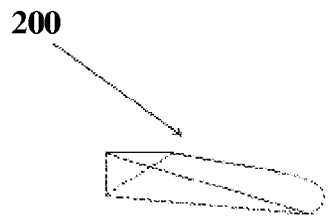

FIGS. 2B and 2C schematically illustrate a mechanical element 200 in front (FIG. 2B) and rear (FIG. 2C) views configured to assist in the directional transmission of the emitted radiation. Mechanical element 200 is configured and operable to route RF radiation waves (shown in FIG. 2C) when it is positioned inside the housing 100 of the charging device 20 in order to allow the creation of a MEV in a desired shape and in a desired location inside the housing 100. The number of mechanical elements 200 and the positioning of each element inside the housing 100 may vary, and the position and shape of the MEV is also accordingly changed as more mechanical elements 200 are positioned inside the housing. In addition, the size and shape of each mechanical element 200 may also vary and affect the shape and size of the created MEV.

The bulk of the created MEV changes according to various parameters related to the mechanical elements 200, such as their amount, their form, and their location inside the housing. For example, the size of the MEV will decrease as the number of mechanical elements 200 for routing the waves in a housing of a specific charging device will increase. The mechanical elements 200 may be manufactured from a type of metallic or dielectric material allowing reflection of the energy to create a defined and concentrated MEV. The mechanical element 200 may be configured in a form of a shelf designed to be mounted on the inner wall of housing and radially protrude a certain width W towards a central axis 212 of the housing 100. The height and shape of the mechanical elements inside the housing 100 relative to the antenna arrangement 120 may generally be proportional to the transmitting frequency, transmitting antenna location, and to the desired charging zone location in the housing 100.

In some embodiments the mechanical element 200 may be made of any material having a dielectric coefficient.

Figure 2D:
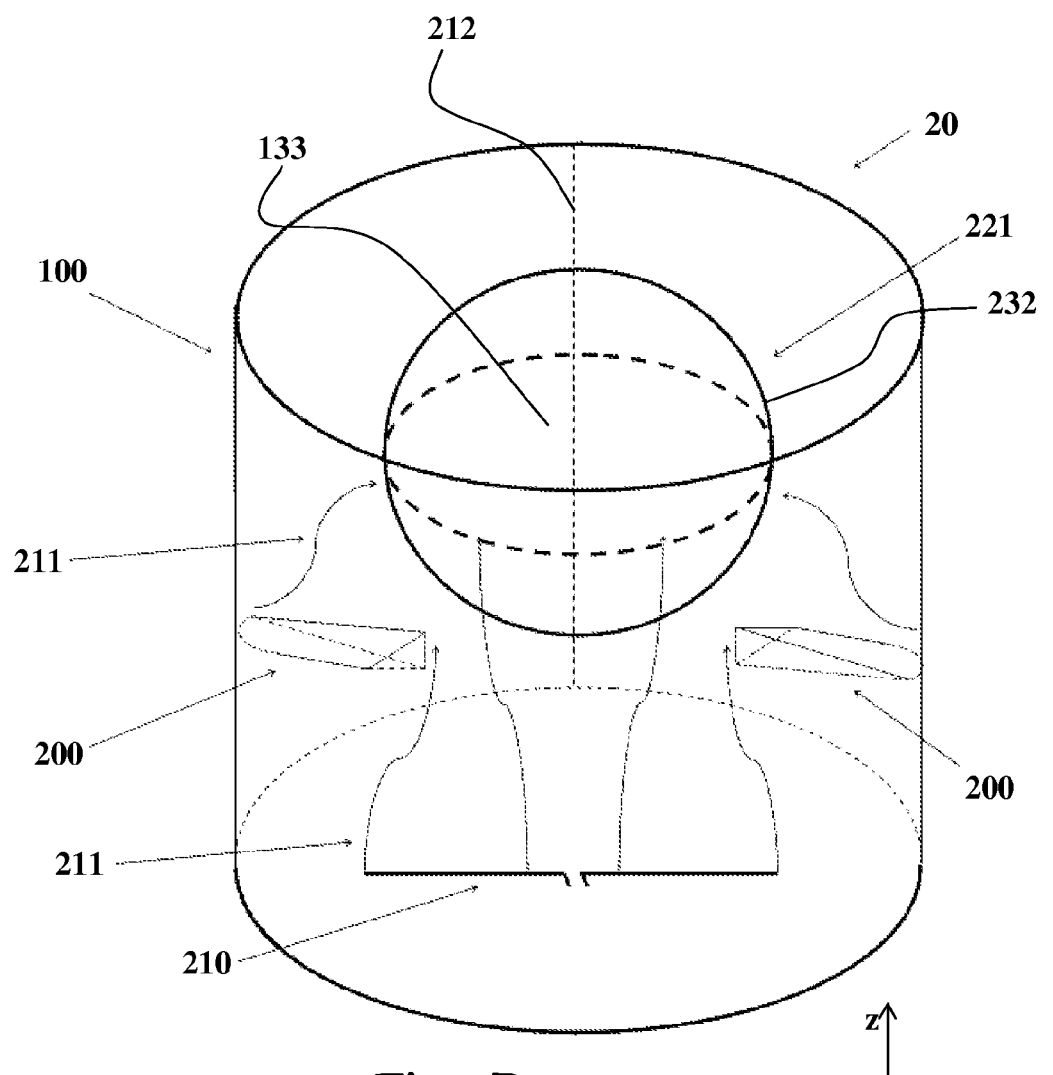

Reference is now made to FIG. 2D schematically illustrating a novel charging device 20 according to some possible embodiments, comprising two units of the mechanical elements 200 shown in FIGS. 2B and 2C. As seen, the mechanical elements 200 are used in this example to direct the RF radiation waves 211 transmitted from the antenna arrangement 210 towards a charging zone 133 defined in the upper portion of the housing 100 and shape the MEV 232 to cover/overlap a volume at a predetermined location (the charging zone) inside the housing of charging device 20.

Upon transmission of antenna arrangement 210, transmitted waves 211 are striking the walls of the housing and the mechanical elements 200 mounted on the inner side of the walls of the housing. The structure/geometry and dimensions of the mechanical elements 200 and their position inside the housing are adjusted to provide a desired interference pattern of the radiation propagating through the cavity defining the MEV 232 in a desired shape and position inside the housing 100.

Within the MEV 232 (at the charging zone 133), the charging process of a chargeable device is the most efficient, compared to other locations inside the housing 100 of the charging device 20. Thus, any electric device positioned within the MEV region 232 will be charged in a maximal efficiency process regardless of the orientation of the electric device. In addition, inside the created MEV region 232 the energy "uptake" by the device being charged is omnidirectional and does not depend on the positioning/orientation of the device being charged thereinside.

Figure 3A:
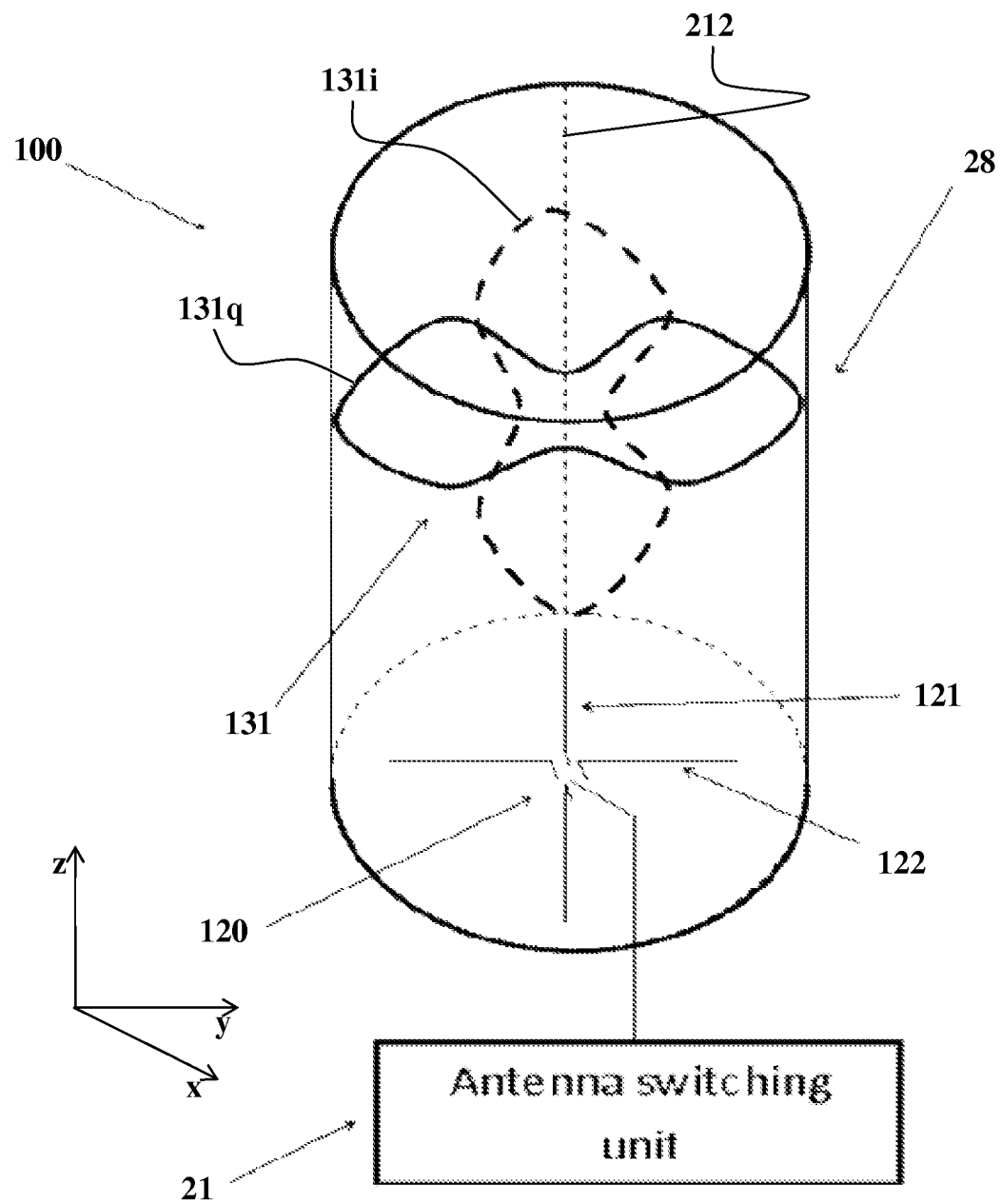
FIGS. 3A to 3E schematically illustrate various embodiments of a charging device configured to allow positioning of a maximal energy volume (density) in a desired location within the housing, wherein FIG. 3A exemplifies use of antenna switching techniques for positioning the MEV at a desired location relative to a transverse plane inside the housing, FIG. 3B exemplifies a frequency sweep/scan technique for positioning the MEV at a desired altitude inside the housing, FIG. 3C exemplifies combining the frequency scan and antenna switching techniques for positioning the MEV at a desired location inside the volume of the housing, FIG. 3D exemplifies use of phase shift adjustment technique for positioning the MEV at a desired location in a transverse plane inside the housing, and FIG. 3E exemplifies combining the frequency scan and phase shift adjustment techniques for positioning the MEV at a desired location inside the volume of the housing.

The width W of the mechanical element 200 may be determined according to various parameters, such as, for example, parameters of the RF radiation (e.g., wavelength) transmitted inside the housing 100, the geometry/dimensions of the housing, and the distance between the mechanical element 200 and the antenna arrangement 210, and the distance between the mechanical element 200 and the charging zone 133. FIG. 3A schematically illustrates a charging device 28 according to some possible embodiments configured for closed space RF harvesting. The charging device 28 in this example is configured to allow positioning of the MEV 131 in a desired location in a transversal plane (i.e., in the X-Y plane) inside the housing 100 of the charging device 28 using an antenna switching unit 21. In some embodiments the charging device 28 comprises at least the following components: a housing 100, an antenna arrangement 120 comprising antennas 121 and 122 positioned in a 90° angle one relative to the other (e.g., on an horizontal plane of the housing 100), and the antenna switching unit 21.

The housing 100 of the charging device 28 shown in FIG. 3A is of a cylindrical (or rectangular) shape. It is however noted that other geometrical shapes of the housing 100 of the charging device 28 are also applicable, and are within the scope of the present invention. In some embodiments, the antenna arrangement 120 used comprises two antennas 121, 122 having substantially the same polarization and being positioned in a 90° angle one relative to the other (e.g., on X-Y plane inside the housing 100). Each antenna, preferably but not necessarily, is a dipole antenna that creates a MEV (131$i$ and 131$q$) according to its position and orientation. Coverage of the X-Y plane (of the cross-section area of the housing 100) may be obtained by the combination of the two antennas by configuring the antenna switching unit 21 to properly select one antenna out of the two to operate and transmit RF radiation so as to provide the MEV 131 at a desired location in the X-Y plane for a specific charging process. Accordingly, unit 21 may be configured to select the antenna that provides better charging conditions i.e., the antenna that provides better charging efficiency with respect to a specific device inserted to the charging device 28. Thus, once the system chooses the better antenna the switching unit 21 is deactivated as long as no further adjustments are needed during the charging session.

In some embodiments the antenna arrangement 120 may comprise additional antenna units that may be positioned in various directions and angular orientations relative to each other and to the other antenna elements in the antenna arrangement. As more antenna elements are being added to the antenna arrangement the surface of MEV 131, created by the transmission of the antenna elements, expands 360° around the central axis 212 (i.e., in the X-Y plane).

As exemplified in FIG. 3A, the antenna array 120 is functionally connected to the antenna switching unit 21 that is configured and operable to switch on/off the antennas 121 and 122 in the antenna arrangement 120 (e.g., by connecting/disconnecting the antennas to a transmitter unit, such as transmitter 110 shown in FIG. 1). In this way the charging device 20 may be configured to transmit predetermined, or adaptively determined, radiation patterns from the antenna arrangement 120 for positioning the MEV 131 in a desired location in the X-Y plane inside the housing 100.

Figure 3B:
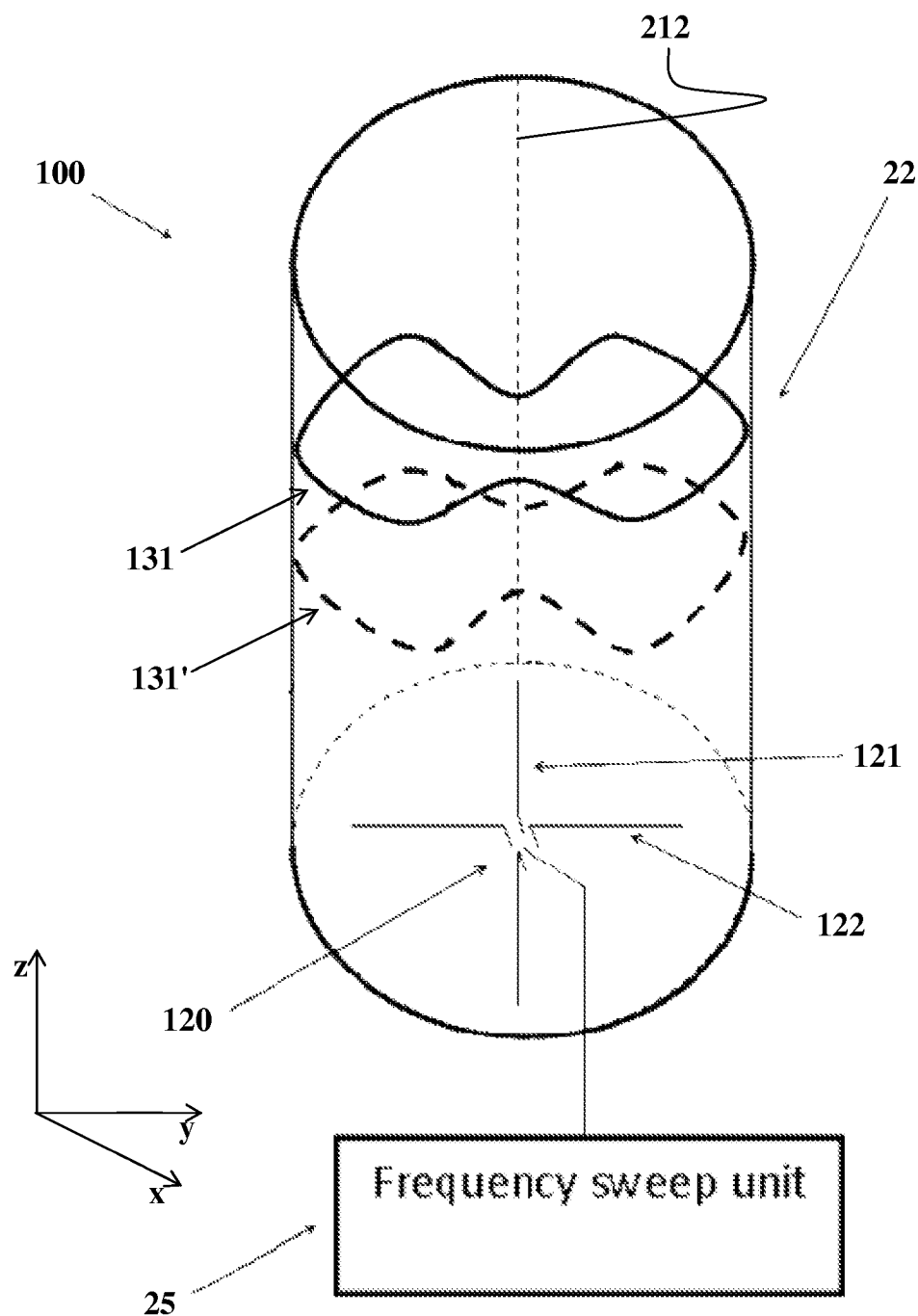

FIG. 3B schematically illustrates a charging device 22 according to some possible embodiments, configured and operable for RF radiation harvesting in a closed space of housing 100. The charging device 22 in this example is configured to allow positioning a generated MEV 131 in a desired location on the Z axis (i.e., at a desired altitude) within the housing 100 using a frequency controller 25 (also referred to as frequency sweep unit).

As in the charging device 28 shown in FIG. 3A, the charging device 22 comprises an antenna array 120 containing two antennas 121, 122 positioned at 90° angle one relative to the another (e.g., on a horizontal plane within the housing 100). As exemplified in FIG. 3B, the frequency controller 25 of the charging device 22 is configured and operable to adjust the frequency of the RF radiation transmitted inside the housing 100 by the antenna arrangement 120 and thereby controllably position the MEV 131 at a desired altitude about the central axis 212 of the housing 100 (i.e., the Z axis). FIG. 3B further exemplifies tuning the location of the MEV 131 to a desired altitude at 131' along the Z axis, by using the frequency controller 25 to adjust the frequency of the transmitted RF radiation.

The frequency controller 25 enables to controllably adjust the position of the MEV 131 (along the Z axis) created by the RF radiation transmitted by the antenna arrangement 120, i.e., it allows determining the altitude of the MEV 131 within the housing 100 (or any other relevant closed chamber/space used for implementing the charging device 22). In some possible embodiments, the frequency controller 25 is configured and operable to modify the transmission frequency, and consequently, the distance of the MEV 131 from the transmitting antenna arrangement 120.

Figure 3C:
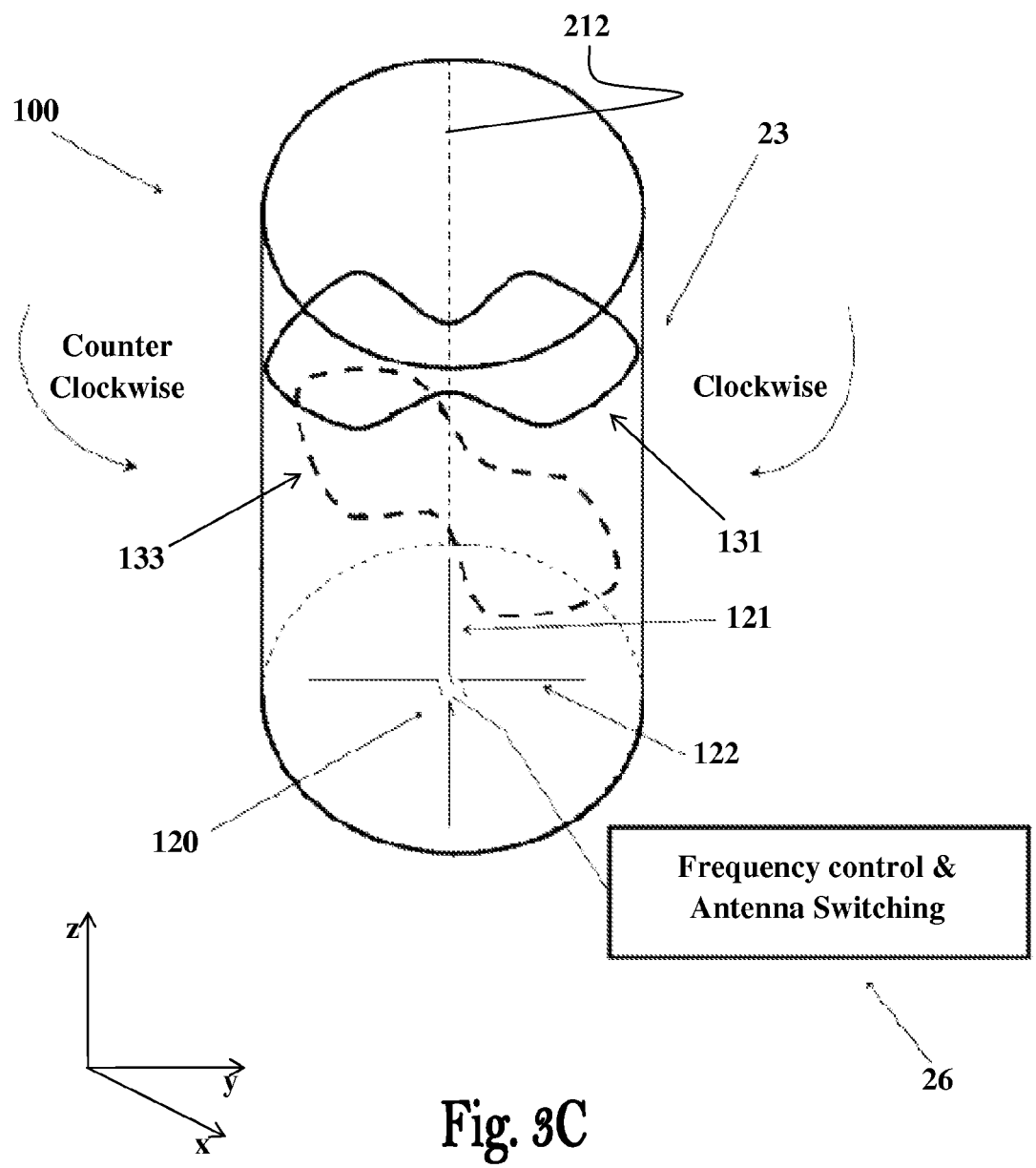

Reference is now made to FIG. 3C schematically illustrating a charging device 23, according to some possible embodiments, configured for RF radiation harvesting in a closed space of housing 100. The charging device 23 is configured and operable for positioning the MEV 131 in a desired location inside the internal volume of the housing 100 (i.e., in X-Y-Z three dimensional space). In this example the location of the MEV 131 in three dimensional space is set using an antenna switching and frequency control unit 26. The antenna switching functionality of the unit 26 is used to transversely set the location of the MEV 131 at a desired position (i.e., relative to the X-Y plane) in the housing, and the frequency control functionality of unit 26 is used to set the altitude of the MEV 131 inside the housing 100 relative to the Z axis. The operation of the antenna switching and frequency control unit 26 is substantially similar to the operation of the antenna switching unit 21 described hereinabove with reference to FIG. 3A, and the frequency controller described hereinabove with reference to FIG. 3B, and thus will not be described in details for the sake of brevity.

As seen, charging device 23 comprises a housing 100, an antenna array 120 comprising antennas 121 and 122, and the antenna switching and frequency control unit 26. FIG. 3C also exemplifies using the antenna switching and frequency control unit 26 to shift location of the MEV 131 up and down along the Z axis, rotate the MEV 131 about the Z axis, and transversely shifting it i.e., sideways (to the right or to the left) and/or back or forth, in the X-Y plane, into a new location at 133, within the housing 100.

Figure 3D:
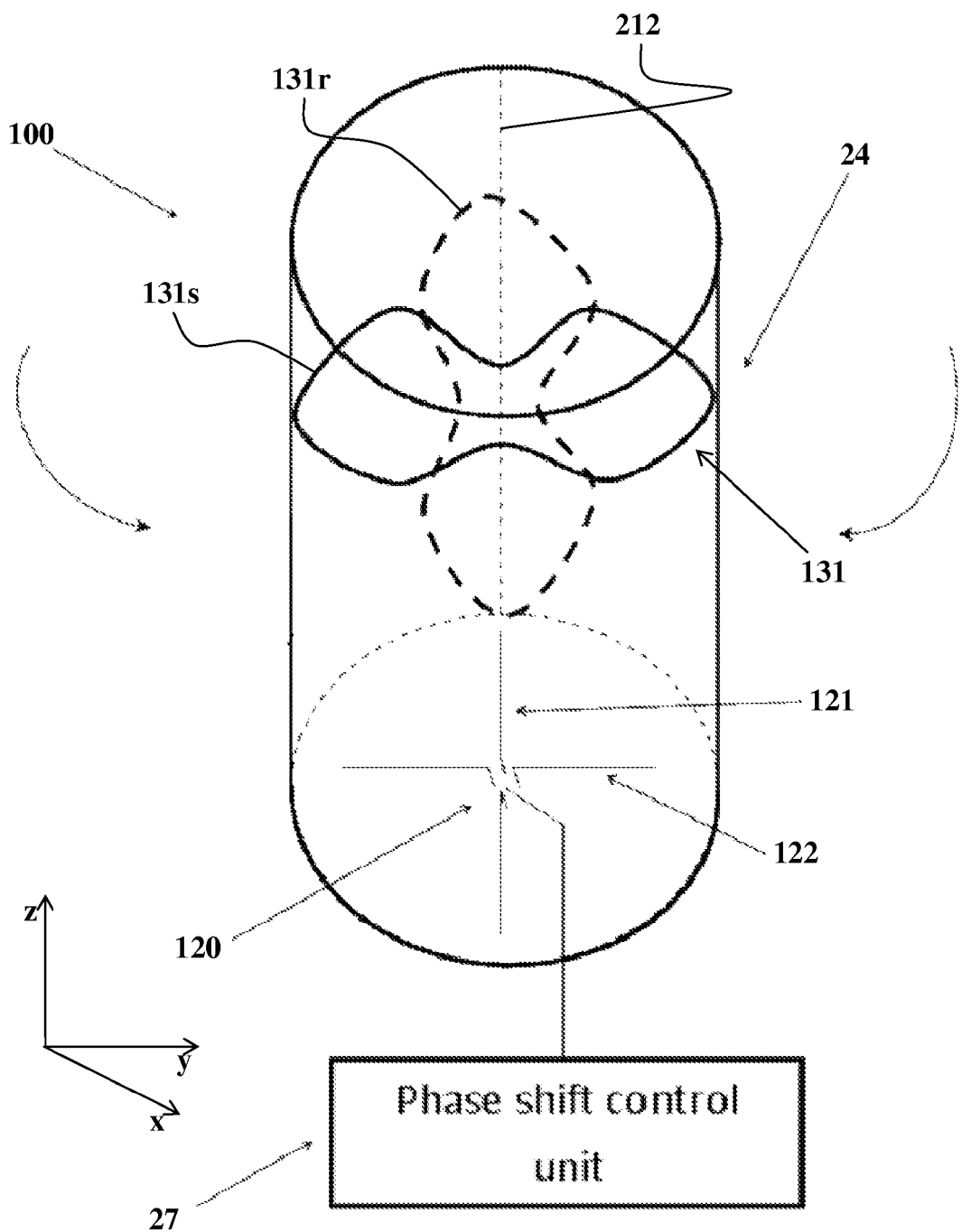

Reference is now made to FIG. 3D schematically illustrating a charging device 24, according to some possible embodiments, for RF radiation harvesting in a closed space of the housing 100. The charging device 24 is configured for positioning the MEV 131 created by transmission of the antenna arrangement 120, at a desired location in the X-Y plane within the housing 100 of charging device 24 using a phase shift control unit 27.

The antenna arrangement 120 contains antennas 121 and 122, positioned in 90° angle one relative to the other (e.g., on a horizontal plane of the housing 100). In some embodiments, both antennas 121 and 122 in the arrangement 120 transmit RF signals in the same frequency, but with a phase shift between the transmitted signals. The phase shift between the RF signals is set by the phase shift control unit 27. Setting the phase shift between the signals transmitted from the antennas in the antenna arrangement 120 allows changing the position of the MEV 131 inside the housing 100, and to shift it to the right and to the left and to turn/rotate it clockwise and counterclockwise about the Z axis, as may be needed.

The embodiment illustrated in FIG. 3D may be used as a variant solution to the technique exemplified in FIG. 3A for changing the position of a MEV in the X-Y plane inside the housing.

In some embodiments the phase shift control unit 27 is configured to rotate the RF radiation emitted by the antenna arrangement 120 by changing the phase shift between the signals transmitted from the different antenna elements, thereby causing clockwise or counter clockwise rotation of the MEV 131 e.g., rotating the MEV 131 about the central axis 212 (the Z axis) of the housing 100 from one angular state at 131s into another angular state at 131r, and in any other intermediate position in between 131s to 131r.

Figure 3E:
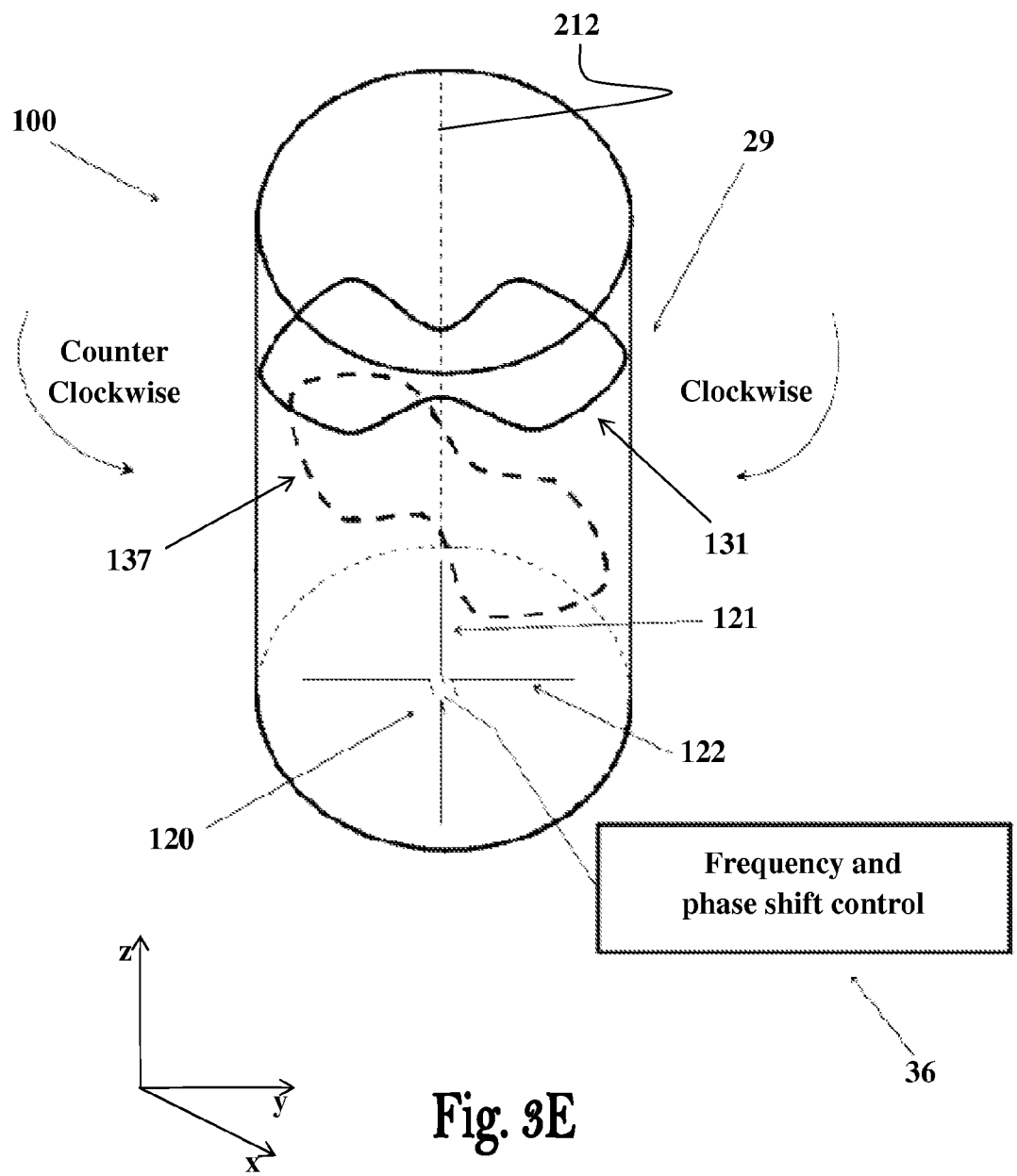

FIG. 3E schematically illustrates a charging device 29, according to some possible embodiments, configured and operable for RF radiation harvesting. The charging device 29 comprises a housing 100, antenna arrangement 120 comprising a pair of antenna elements, 121 and 122, perpendicularly positioned one relative to the other, as described hereinabove with reference to FIGS. 3A to 3C, and a frequency and phase control unit 36. Using the frequency and phase control unit 36 the charging device 29 is capable to set the altitude of the MEV 131 at a desired position along the Z axis, by adjusting the frequency of the signals transmitted from the antennas of the antennas arrangement 120, and set the location of the MEV 131 in the X-Y plane inside the housing 100, by changing the phase difference between the signals transmitted from the antennas, and thereby cause rotation of the MEV 131 inside the housing 100 about the Z axis.

For example, by properly adjusting the frequency of the signals transmitted from the antennas, and the phase shift between the transmitted signals, the altitude and angular position of the MEV at 131 may be both changed into a new state 137 in which the MEV is rotated about the Z axis a predetermined angle and shifted along the Z axis a predetermined distance.

Figure 4A:
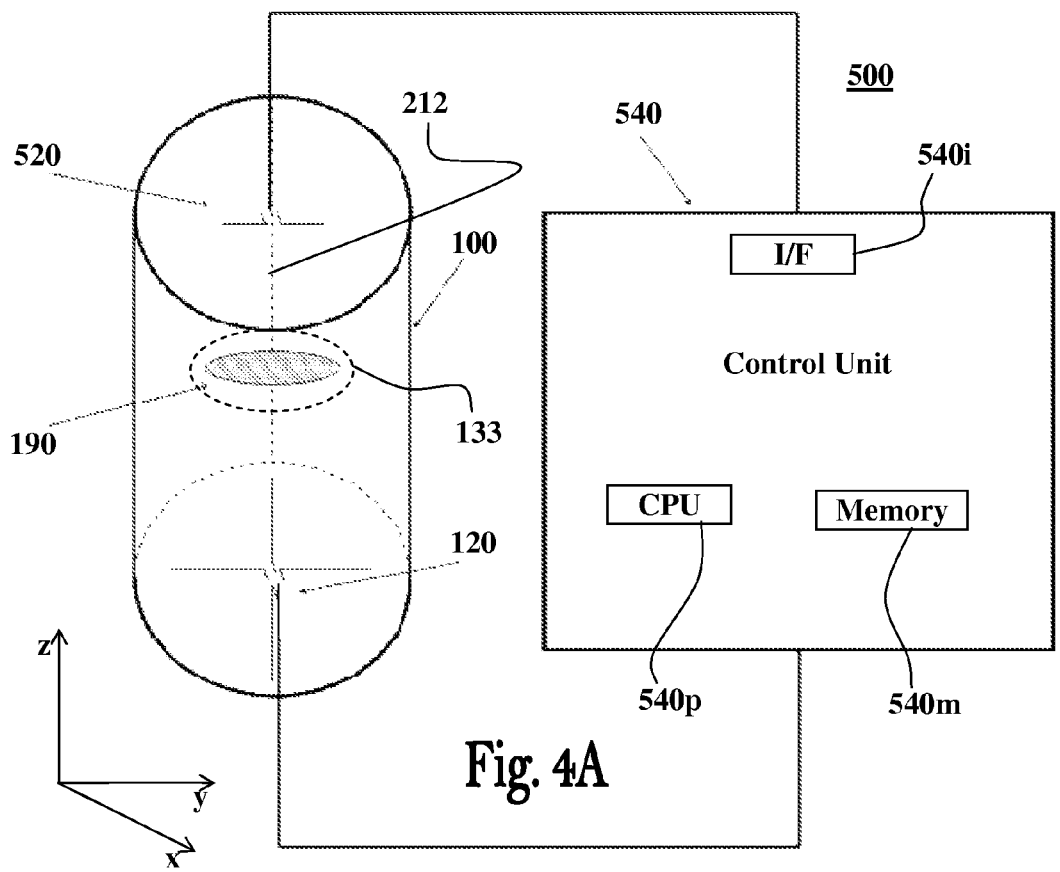
FIGS. 4A and 4B schematically illustrate a charging device according to some embodiments, wherein FIG. 4A demonstrates use of a sensor unit inside the charging device and FIG. 4B demonstrates a harvesting configuration usable for communicating control signals with the device being charged.
Figure 4B:
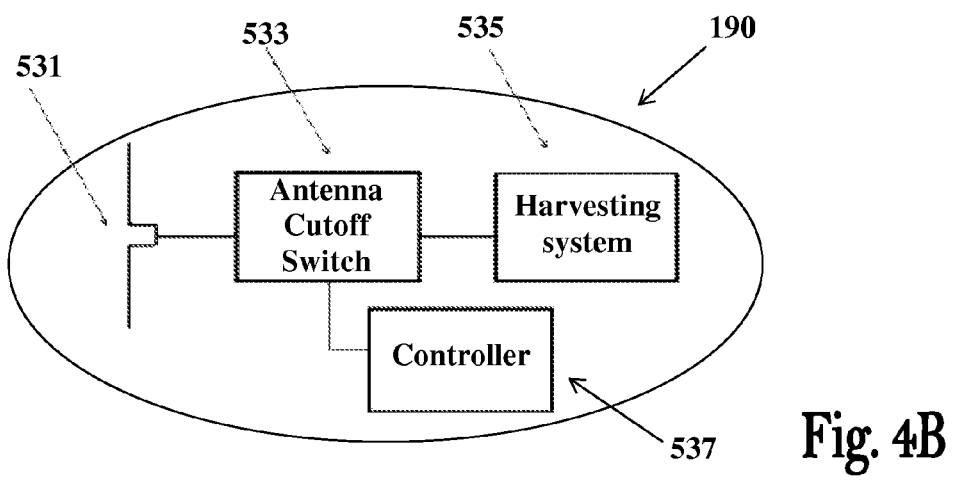

Reference is now made to FIGS. 4A-4B. FIG. 4A schematically illustrates a charging device 500, according to some possible embodiments, comprising a housing 100, a sensor unit 520, a transmitting antenna arrangement 120, a device 190 placed inside the housing 100 for charging, and a control unit 540. For the sake of simplicity of the description, none of the elements described hereinabove and illustrated with reference to FIGS. 2A-2D and 3A-3E, that enables, shaping the MEV, positioning the MEV in a desired location along the Z axis and/or transversely shifting it in the X-Y plane of the housing 100, and/or rotating it inside the housing 100 about the Z axis, are illustrated, although it should be clear that any of these elements may be used in the charging device 500 shown in FIG. 4A.

As explained hereinabove, RF transmission through the antenna arrangement 120 creates a MEV (not shown) and energy is being transmitted to the device being charged 190. Sensor unit 520 positioned inside the housing 100 may be configured and operable to sequentially/periodically sample the RF radiation and generate data indicative of the energy level inside the housing 100 at a predetermined location where the sensor unit 520 is placed. The data generated by the sensor unit 520 is transferred to the control unit 540 which process and analyze the received data and based thereon reach various determinations about the charging session carried out for the charging of the device 190.

The control unit 540 may be a type of programmable controller (e.g., using ASIC or FPGA design) having a data storage and data processing capabilities. For example, the control 540 unit may comprise a memory 540m for storing data, program code/modules and any other information that may be needed for the operation of the charging device 500, and a processor (CPU) 540p configured and operable to execute programs stored in the memory 540m, process data received from the memory 540m and/or the sensor unit 520, and store the data received or computed in the memory 540m. The control unit 540 may further comprise a data transfer interface (I/F) 540i configured and operable to exchange (e.g., wirelessly—Bluetooth, infrared, ZigBee, and/or over serial/parallel data wires/bus—UART, USB, and suchlike) data with other devices e.g., receive data from the sensor unit 520.

In some possible embodiments the control unit 540 is configured and operable to increase/decrease the intensity of the transmission from the antenna arrangement 120, as well as adjusting other transmission parameters of the antennas. The control unit 540 may be further configure and operable to modify the positioning of the MEV created inside the housing 100 according to the transmission level and the positioning of device 190 inside the housing 100 of the charging device 500. Accordingly, the position of the device 190 being charged may be a fixedly predetermined position inside the housing 100, and data indicative thereof may be stored in the memory 540m.

In some possible embodiments the control unit 540 is configured and operable to determine the location of the device being charged 190 inside the housing 100 based on parameters of the RF radiation for which most efficient delivery of RF energy is obtained. For example and without being limiting, the location of the device 190 inside the housing 100 may be calculated upon determining a frequency of the radiation RF for which most efficient RF energy is delivered for charging the device 190.

During the charging session, the data indicative of the intensity of the RF radiation near, or at, the charging zone 133 is obtained from the sensor unit 520 and processed by the control unit 540. In general, the control unit 540 is not required to perform any actions associated with the charging session as long as the data received from the sensor unit 520 indicates the device being charged 190 receives maximal charging energy.

For example, in possible embodiments the sensor unit 520 may be located above the charging zone 133 (e.g., such that the charging zone 133 is located between the sensor unit 520 and the antenna arrangement 120), and if the data received from the sensor unit 520 is associated with a predetermined minimal radiation intensity value the control unit determines that the device being charged 190 receives maximal charging energy (i.e., indicating the transmitted RF energy is substantially consumed by the charging load of the device 190). In the event that the data obtained from the sensor unit 520 is indicative of radiation intensity levels that are above the minimal predefined value (i.e., indicating the RF energy is not efficiently consumed), then it is determined by the control unit 540 that the device being charged 190 does not receive maximal charging energy, and responsively, the control unit 540 carry out actions for modifying the transmission parameters and/or positioning the MEV inside the housing 100 to improve the transfer of RF energy from the antenna arrangement 120 to the harvesting system of the device 190. The control unit 540 may be configured to carry out any one (or a combination) of the actions described hereinabove with reference to FIGS. 3A to 3E to move/rotate the MEV 131 inside the housing 100 into a new position to maximize the transfer of RF energy from the antenna arrangement 120 the device being charged.

In some possible embodiments the sensor unit 520 is used to provide various different functionalities, comprising: calibration of the charging system 500; verification that the maximal intensity of the electromagnetic radiation arrives/exists in the vicinity of the device being charged 190; and establishment of communication between the device being charged 190 and the control unit 540. A possible configuration for communicating between the device being charged 190 and the control unit 540 via the sensor unit 520 is schematically illustrated in FIG. 4B.

FIG. 4B is a block diagram illustrating a possible configuration comprised inside the device being charged 190 for communicating control signals with the control unit 540, according to some possible embodiments. As seen, in this embodiment a receiving (harvesting) antenna 531 is functionally connected to an antenna cutoff switch circuit 533 that is connected to a harvesting system 535 and to a controller 537 of device 190. Delivery of signals between device 190 and the control unit 540 of the charging device 500 is functionally performed via antenna cutoff switch circuit 533 that is configured and operable to selectively disconnect the receiving antenna 531 intermittently whenever control signals are to be communicated with the control unit 540.

Consequently, responsive to the disconnections of the receiving antenna 531, the signals obtained by sensor unit 520 vary/change according to the frequency and the time durations of the cutoffs of the harvesting antenna 531, as each time the antenna cutoff switch circuit 533 detaches the receiving antenna 531, the transmitted energy is not being "caught" by device 190 (as the charging load is disconnected) and consequently maximal radiation intensity values are obtained by the sensor unit 520 that receives most of the transmitted energy.

The changes in the intensity of the radiation inside the housing 100 perceived by the sensor unit 520 are reflected in the data transmitted to the control unit 540 from the sensor unit 520. The control unit 540 processes and analyzes the data received from the sensor 520 to determine the existence of patterns in the changes in the radiation intensity used by the controller 537 of the device 190 to encode control signals. Responsive to determination that control signals are being encoded in by the controller 537 in the measured changes in radiation intensity, the control unit 540 carry out any needed actions based on the encoded control signals. For example, the control unit 540 may adapt the charging process according to the data received from the sensor unit to improve the efficiency of the charging session.

In some possible embodiments the number and pattern of cutoffs applied by the controller 537 of the device 190 is predefined (e.g., based on data in the firmware or the software of the controller of the charging device 500 and the device 190). For example, one cutoff of the antenna once in every some predetermined time period may indicate that the charging process is performed in an optimal manner (i.e., maximal charging energy is received by the harvesting unit 535 of the device 190); four sequential cutoffs of the receiving antenna 531 within such predetermined time period may indicate that the device 190 is fully charged; eight sequential cutoffs of the receiving antenna 531 within such predetermined time period may indicate that there is a need to increase the transmission level. Accordingly, for example, the control unit 540 may receives from sensor unit 520 different energy level reads, and according to the number of cutoffs determines the status of the charging session of device 190 and the actions to be performed responsively.

Figure 5:
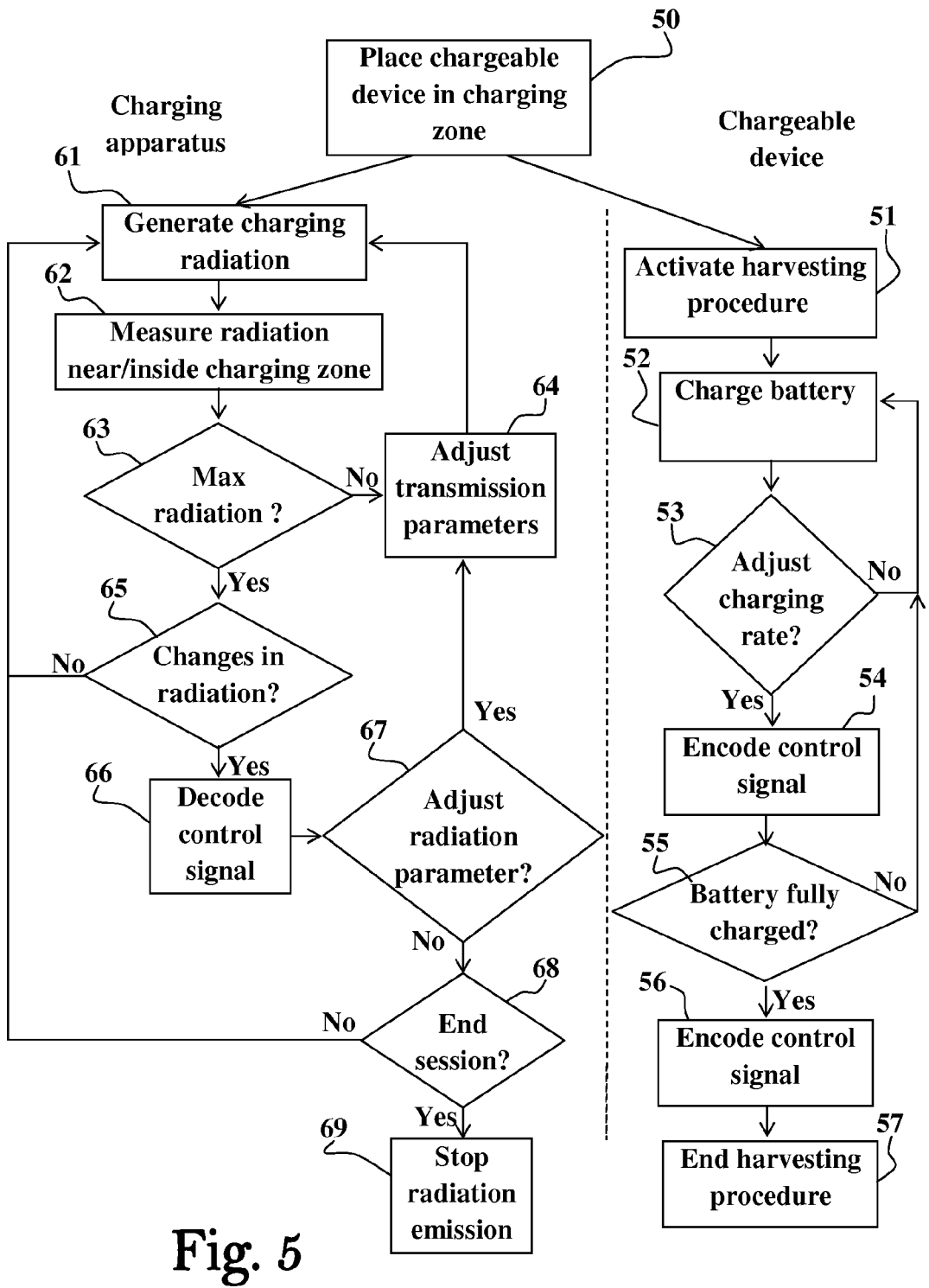
FIG. 5 is a flowchart demonstrating a charging session according to some possible embodiments.

FIG. 5 is a block diagram illustrating a possible charging session according to some embodiments. The charging session is initiated in step 50 by placing a chargeable device inside the housing of a charging device of this application, as described hereinabove. Typically, the chargeable device is placed in a predefined charging zone inside the housing, or slid thereto by guiding means provided in the housing, as described hereinabove. Next, in step 61, the charging device is activated and RF radiation is transmitted from its antenna arrangement towards the charging zone. The device to be charged detects the RF radiation generated by the charging device and in step 51 the device activates its harvesting system to charge its battery and in step 52 starts the charging process.

In step 62 the charging device measure the RF radiation inside the housing of the device, and in step 63 it is determined based on the measured RF radiation if the MEV is properly positioned inside the housing to efficiently transfer maximal RF charging energy to the device. If it is determined in step 63 that the RF energy is not efficiently transferred to the device, then in step 64 the transmission parameters are adjusted to move and/or rotate the MEV inside the housing to improve the charging process and the control is passed back to step 61. The RF radiation measurement and adjustment of steps 61 to 64 may be repeated a number of times until it is determined in step in step 63 that the RF radiation energy is efficiently delivered to the device being charged and the efficiency of the charging session is improved.

The device being charged may be configured to determine from time to time (or periodically) the efficiency of the charging process, as indicated by step 53. If it is determined in the device that adjustments are needed to improve the charging process, then the control is passed to step 54 to encode control signals by inducing changes in the RF radiation inside the housing (e.g., using antenna cutoff circuitry 533). Otherwise, if it is determined in step 53 that the charging process is proper, then the control is passed back to step 52 to proceed with the charging process as is. In step 55 it is determined if the battery of the device being charged is fully charged. If further charging is needed then the control is passed back to step 52 to proceed with the charging process, otherwise, if it is determined that the battery is sufficiently charged then in step 56 a respective control signal is encoded by inducing changes in the RF radiation to indicated to the charging device that the charging process is to be ended, the control is passed then to step 57 wherein the device stops the operation of the harvesting system and terminates the charging.

If it is determined at the charging device in step 63 that the RF radiation energy is efficiently transferred to the device being charged the control is passed to step 65 wherein it is checked if there are variations in the intensity of the RF radiation inside the housing that may be induced by the controller of the device being charged. If such changes are not detected, the control is passed to step 61 to proceed with the charging session. If changes in the RF radiation are detected in step 65, then in step 66 data (e.g., control signals) decoded by the charging device inducing the changes are decoded and analyzed. In step 67 it is determined if control signals decoded in the detected changes indicate that adjustments in the RF radiation are needed. If such adjustments are needed, then the control is passed to step 64 to carry out any needed adjustments to improve the efficiency of the charging process, as described herein above.

In case decoded signals do not indicate that adjustments are needed, then in step 68 if the decoded signal indicates that the device instructs the device to terminate the charging session, then control is passed to step 69, wherein the charging device stops the emission of the RF radiation and terminates the charging session. Otherwise, if no actions are to be carried out (e.g., the detected changes in the RF radiation were used to transfer data to the charging device, or the decoding failed to recognize control signals/data in the induced changes), then the control is passed back to step 61 to proceed with the charging session.

EXAMPLES

In the following example various configuration of the inner cavity of the housing of the charging device were tested using computer simulation software (CST 3D electromagnetic field simulations). The dimensions of the inner cavity in the following examples, are as follows:

In Examples 1, 2 and 3: Length: 70 to 100 mm;
Width/diameter: 70 to 90 mm; and
In Examples 3: Height: 10 to 30 mm In all Examples, a distance between the antenna arrangement plane and the MEV/charging zone (depending on the frequency of emitted radiation for a given geometry of the cavity) is about 20-50 mm.

Example 1 (Cylindrical Inner Cavity)

Figure 6A:
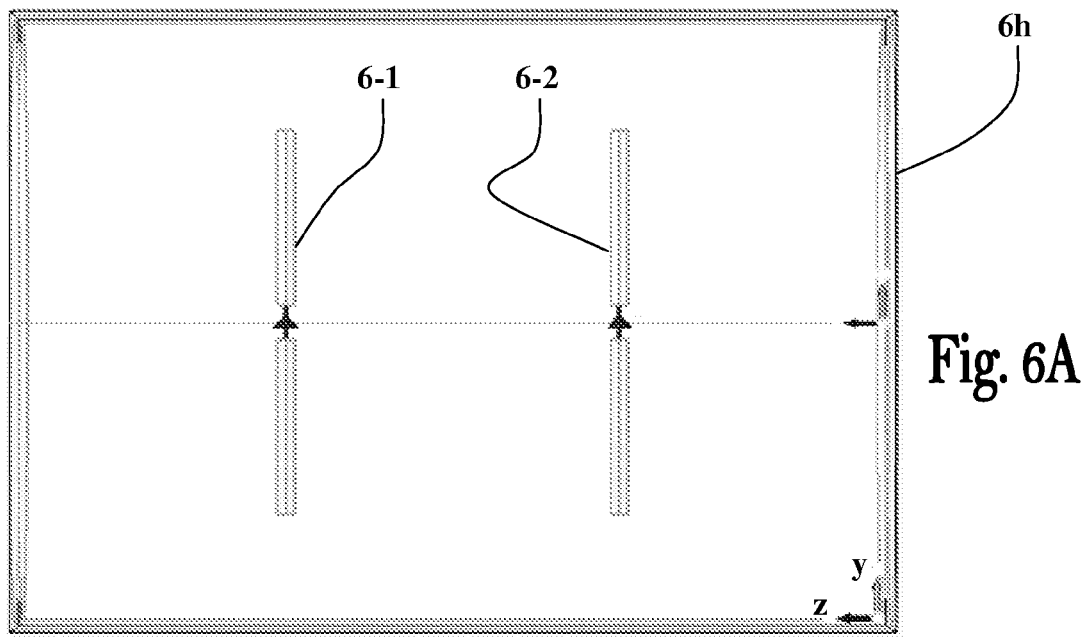
FIGS. 6A and 6B show a simulation carried out for a substantially cylindrical configuration of the inner cavity of the housing, wherein FIG. 6A schematically illustrates the simulation setup

This experiment tested the efficiency of RF radiation delivery in a cylindrically shaped housing structure 6h. FIG. 6A schematically illustrates the experiment setup, wherein transmitting antenna 6-1 and receiving antenna 6-2, positioned inside the housing 6h were used to simulate a charging process. RF radiation power of 1 Watts emitted by the transmitting antenna 6-1 is received by the receiving antenna 6-2 configured to measure the intensity of the RF radiation. The results shown in FIG. 6B reflect the ratio of the measured RF radiation power and the total RF transmission power transmitted by the transmitting antenna 6-1.

Figure 6B:
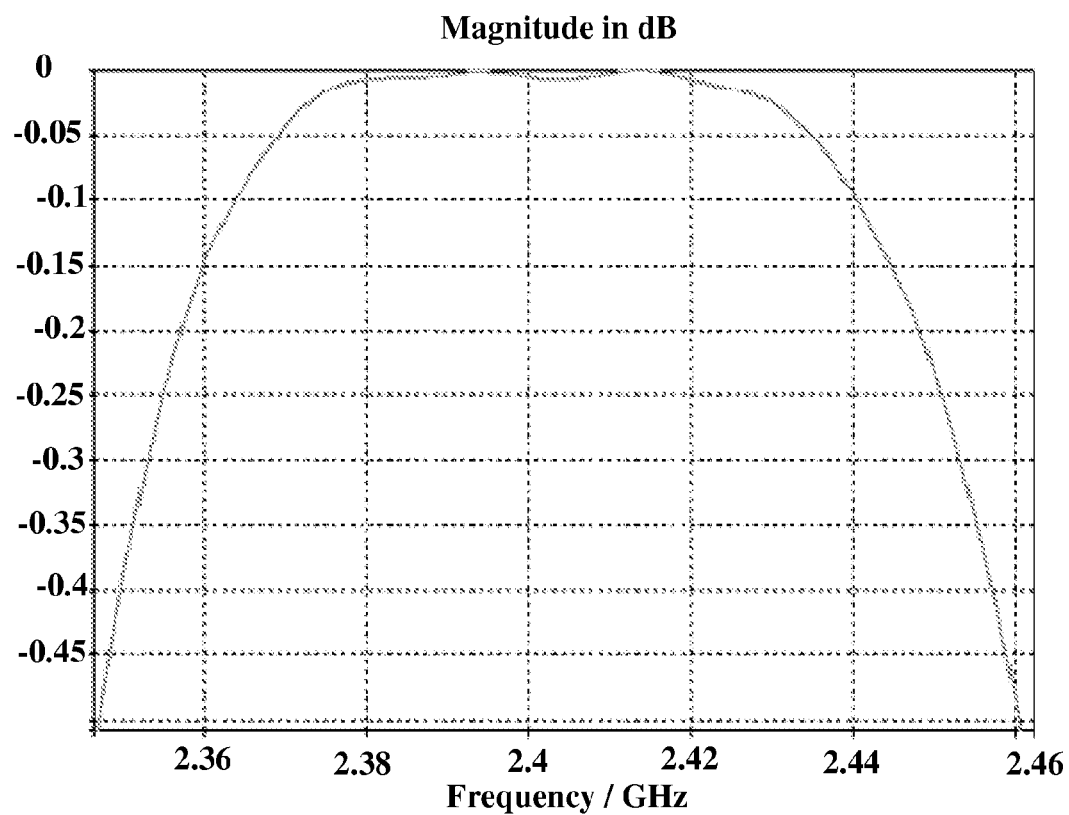

As seen in FIG. 6B the power loses in this experiment are between 0 to −0.05 dB in the 2.37 to 2.43 GHz frequency range (90-100%).

Example 2 (Conical Housing)

Figure 7A:
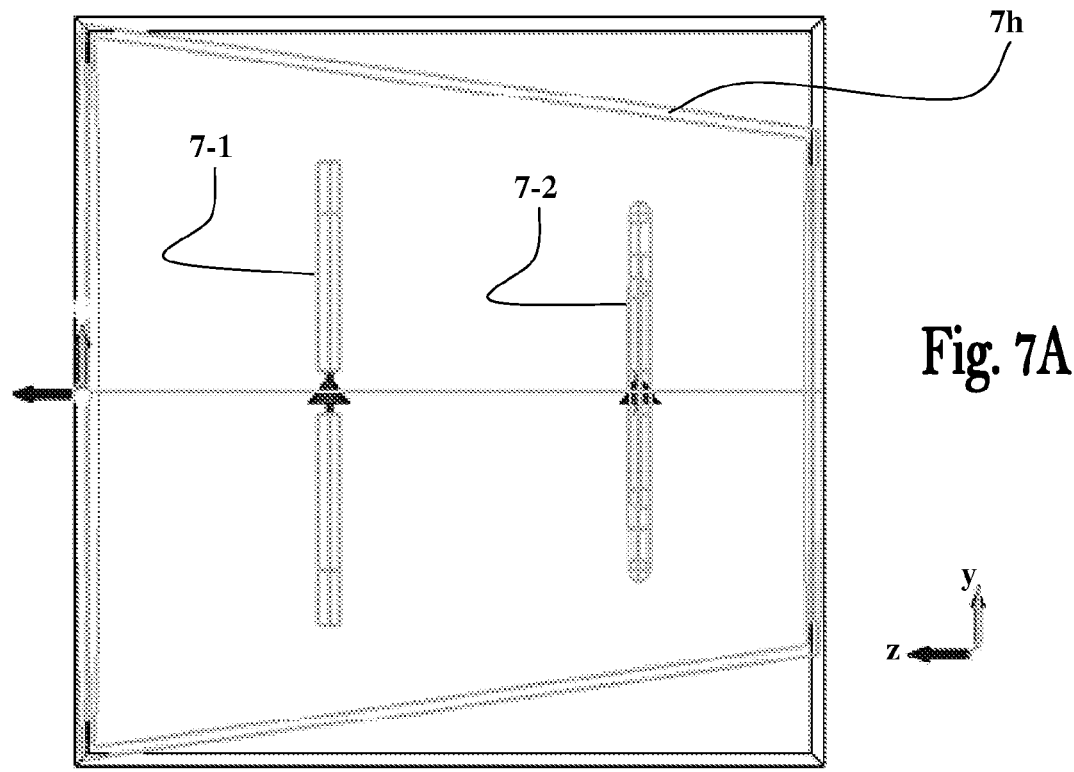
FIGS. 7A and 7B show a simulation carried out for a substantially conical configuration of the inner cavity of the housing, wherein FIG. 7A schematically illustrates the simulation setup
Figure 7B:
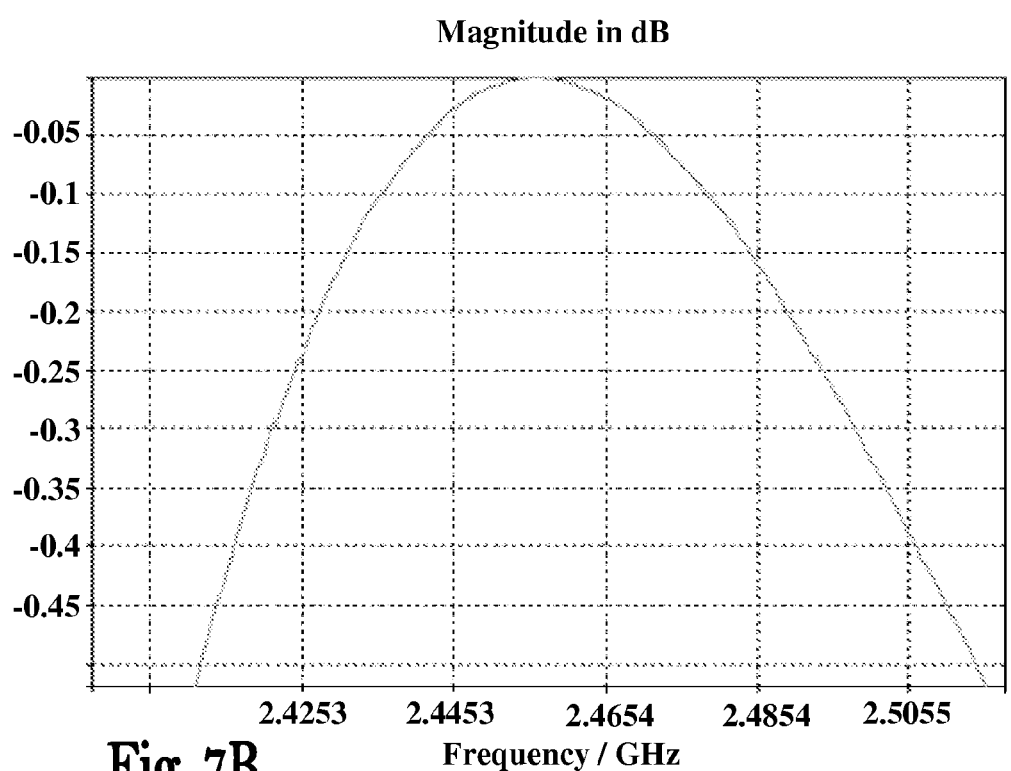

In this experiment a tapering housing (frusto-conical) configuration was tested. The experiment setup and the measured results are shown in FIGS. 7A and 7B respectively. As in Example 1, a transmitting antenna 7-1 and a receiving antenna 7-2, were used to simulate a charging process inside the tapered housing structure 7h. As seen in FIG. 7B, the power loses in this experiment are between 0 to −0.05 dB in the 2.44 to 2.47 GHz frequency range.

Example 3 (Rectangular Housing)

Figure 8A:
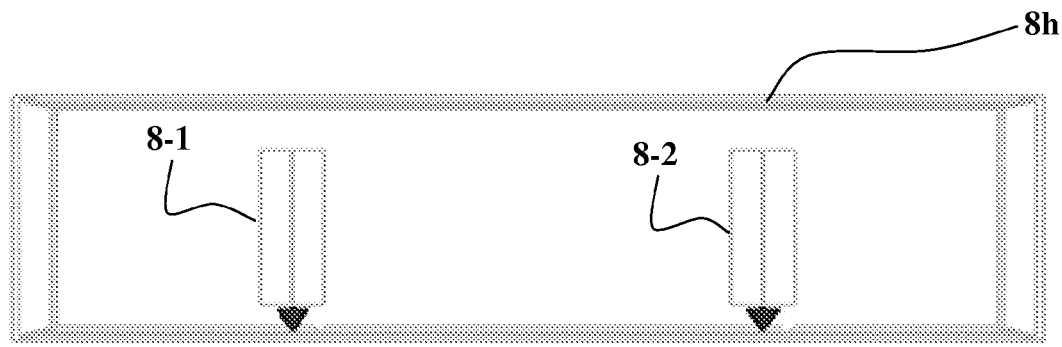
FIGS. 8A and 8B show a simulation carried out for a substantially rectangular configuration of the inner cavity of the housing, wherein FIG. 8A schematically illustrates the simulation setup
Figure 8B:
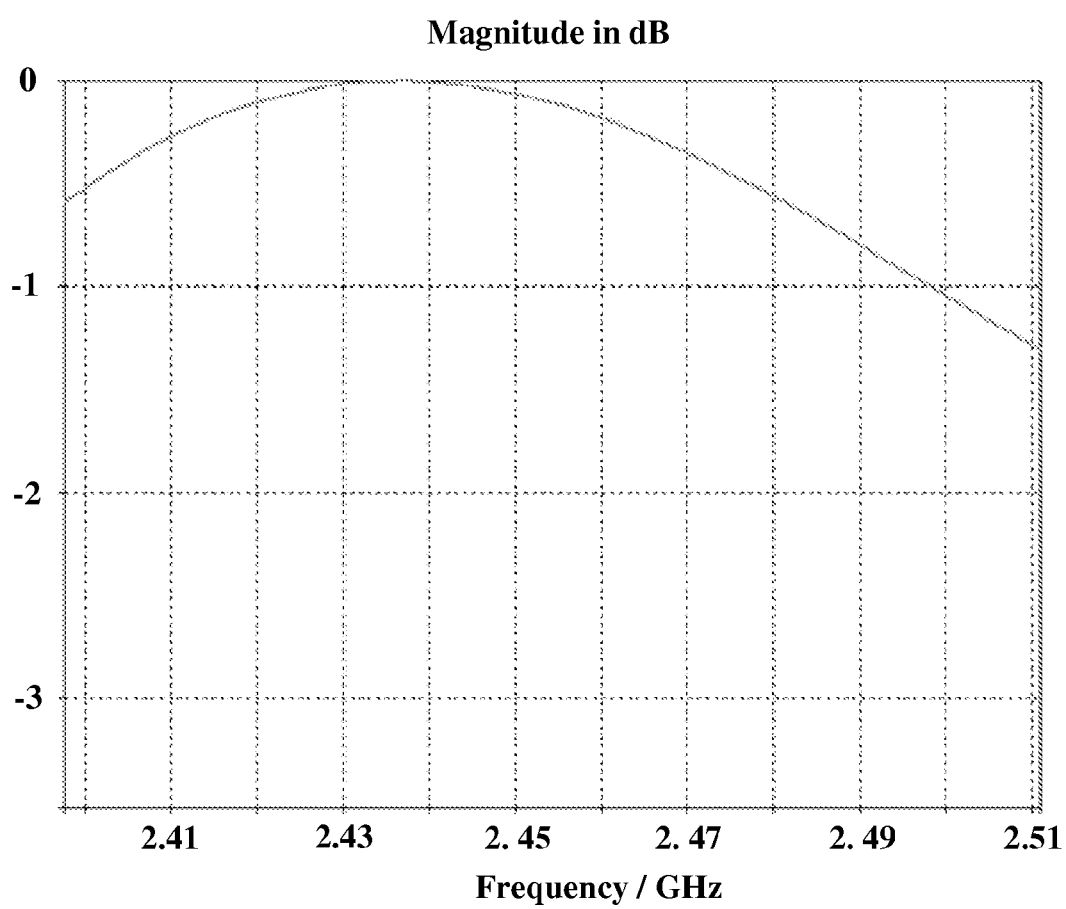

In this experiment a rectangular housing configuration was tested. The experiment setup and the measured results are shown in FIGS. 8A and 8B respectively. As in the previous examples, a transmitting antenna 8-1 and a receiving antenna 8-2, were used to simulate a charging process inside the rectangular housing structure 8h. FIG. 8B shows the simulation results obtained to test the RF energy transmission between the transmitting antenna 8-1 and the receiving antenna 8-2

It should be clear that the description of the variations and attached figures set forth in this specification serves only for a better understanding of the invention, without limiting its scope. It should also be clear that a person skilled in the art, after reading the present specification could make adjustments or amendments to the attached Figures and above described variations that would still be covered by the present invention.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure may be carried out or practiced in various ways, and that the disclosure may be implemented in embodiments other than the exemplary ones described herein below. The descriptions, examples and materials presented in the description, as well as in the claims, should not be construed as limiting, but rather as illustrative.

The invention claimed is:

1. A charging device for wireless charging at least one electric device using electromagnetic radiation, the device comprising:
   a housing comprising:
      a charging zone; and
      an antenna arrangement which comprises at least one radiating antenna, the antenna arrangement being operable to emit the electromagnetic radiation to provide a maximal intensity of electromagnetic radiation within at least a part of said charging zone;
   said housing is substantially hollow defining an inner cavity for propagation of the electromagnetic radiation from said antenna arrangement;
   said housing comprises an inner surface thereof configured to define said inner cavity, the geometry and material composition of said inner surface being selected to define a general propagation path for the electromagnetic radiation from said antenna arrangement towards said charging zone inside said housing such that the inner cavity of the housing operates as a waveguide for directionally guiding the electromagnetic radiation to said charging zone and enabling the creation of a volume of maximal intensity of the electromagnetic radiation within at least a part of said charging zone, while substantially preventing the electromagnetic radiation from escaping the housing.

2. The charging device of claim 1, wherein the geometry of the inner surface of the housing defining geometry of the inner cavity and a frequency band of the electromagnetic radiation to be emitted by the antenna arrangement are selected to create the volume of substantially maximal intensity of the electromagnetic radiation of the frequency band within the at least part of the charging zone.

3. The charging device of claim 1, wherein the housing comprises at least one radiation directing element projecting from the inner surface towards the radiation propagation path, the at least one radiation directing element being configured for directionally deflecting the electromagnetic radiation towards the charging zone.

4. The charging device of claim 3, wherein the at least one radiation directing element is configured for scattering the electromagnetic radiation to cause further multiple reflections of the radiation from the inner surface towards the charging zone.

5. The charging device of claim 1, wherein the charging zone inside the housing comprises a supporting surface configured for supporting one or more electric device to be charged inside the cavity.

6. The charging device of claim 1, wherein the antenna arrangement and the inner surfaces of the housing defining the cavity are configured and operable to create a predetermined interference pattern of the radiation propagating through the cavity, the predetermined interference pattern providing the substantially maximal radiation intensity within at least a part of the charging zone.

7. The charging device of claim 1, wherein the antenna arrangement comprises an array of radiating antennas arranged in a spaced apart relationship along one or two axes or along a closed loop path.

8. The charging device of claim 1, wherein the antenna arrangement comprises phase shifted antennas providing the substantially maximal radiation intensity within at least a part of the charging zone.

9. The charging device of claim 1, wherein the phase pattern is such that phases of the radiation emitted by the antenna vary along at least one axis in a plane substantially perpendicular to the general radiation propagation path.

10. The charging device of claim 1, wherein the housing contains a sensor unit configured and operable for measuring radiation intensity in the vicinity thereof, thereby enabling controlling radiation intensity distribution within at least a part of the charging zone.

11. The charging device of claim 10, wherein the sensor unit comprises at least one sensing antenna located at a known distance from the charging zone, thereby enabling the controlling of intensity distribution within the charging zone.

12. The charging device of claim 10, wherein the sensor is configured and operable to detect a change in one or more parameters of the radiation in the vicinity thereof to thereby identify a signal from the electric device being charged and generate data indicative thereof.

13. The charging device of claim 10, wherein said sensor unit is configured for communication with a control utility to thereby enable operation of the antenna arrangement to carry out at least one of the following: (a) selective deactivation of at least one antenna of the antenna arrangement, (b) controllable variation of a frequency of the radiation; and (c) controllable variation of a phase shift between waves radiated from antennas of the antenna arrangement.

14. The charging device of claim 1, further comprising a controller located outside said housing and being connectable to one or more elements inside the housing, the controller being configured and operable to carry out at least one of the following: (1) provide a phase shift between the antennas; (2) controllably vary a frequency of the radiation to provide an optimal frequency of the radiation in the charging zone; or (3) selectively deactivate at least one antenna of the antenna arrangement.

15. A charging device for wireless charging at least one electric device using radio frequency (RF) radiation, the device comprising:

a housing comprising:
  a charging zone; and
  an antenna arrangement which comprises a plurality of antennas
  said plurality of antennas are operable by a switching unit to provide a maximal intensity of electromagnetic radiation within at least a part of said charging zone; and
  said antenna arrangement is associated with a frequency controller to thereby enable controllable variation of a frequency of the electromagnetic radiation, thereby providing at least a partial overlap between the volume of the maximal intensity of the electromagnetic radiation and at least a part of the charging zone,
said housing is substantially hollow defining an inner cavity for propagation of electromagnetic radiation from said antenna arrangement; and
said housing comprises an inner surface thereof configured to define said inner cavity, the geometry and material composition of said inner surface being selected to define a general propagation path for the electromagnetic radiation from said antenna arrangement towards the charging zone inside said housing such that said inner cavity operates as a waveguide for directionally guiding the electromagnetic radiation to said charging zone and enabling the creation of a volume of maximal intensity of the electromagnetic radiation within at least a part of said charging zone while substantially preventing the electromagnetic radiation from escaping said housing.

16. The charging device according to claim 15, wherein said switching unit selectively activate at least two antennas to create a phase shift between said at least two antennas thereby enabling controlling of the radiation intensity and distribution within the charging zone.

17. The charging device according to claim 15, wherein said switching unit is operated to optimize the creation of the maximal energy volume by selectively activating and deactivating said antennas.

18. A method for charging at least one electric device using radio frequency (RF) radiation, the method comprising:
providing a charging device comprising an antenna arrangement having a plurality of antennas and a charging zone;
operating the antenna arrangement to generate electromagnetic radiation having frequency and phase selected to thereby create a volume of maximal intensity of the electromagnetic radiation within at least a part of the charging zone
monitoring the radiation in a vicinity of the charging zone; and
in response to the monitoring, carrying out at least one of the following: (1) providing a phase shift between antennas of the antenna arrangement; (2) controllably varying a frequency of the radiation to provide an optimal frequency of the radiation in the charging zone; (3) selectively deactivating at least one antenna of the antenna arrangement.

* * * * *